(12) United States Patent
Warren et al.

(10) Patent No.: US 11,361,373 B1
(45) Date of Patent: Jun. 14, 2022

(54) SYSTEM AND METHOD FOR PROVIDING INDICIA TO FILTERED SEARCH RESULTS TO INDICATE APPLIED FILTERS

(71) Applicant: AMAZON TECHNOLOGIES, INC., Seattle, WA (US)

(72) Inventors: Brian Warren, Edmonds, WA (US); Nathan Ross Mueller, Edina, MN (US); Aaron Michael Strom, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 410 days.

(21) Appl. No.: 15/823,455

(22) Filed: Nov. 27, 2017

(51) Int. Cl.
*G06Q 30/06* (2012.01)
*G06F 16/9535* (2019.01)

(52) U.S. Cl.
CPC ..... *G06Q 30/0643* (2013.01); *G06F 16/9535* (2019.01); *G06Q 30/0623* (2013.01)

(58) Field of Classification Search
CPC .... G06F 16/156; G06F 16/335; G06F 16/338; G06Q 30/0256; G06Q 30/0643; G06Q 30/0601–0645; G06Q 30/023
USPC .............................................. 705/26.1–27.2
See application file for complete search history.

(56) References Cited

U.S. PATENT DOCUMENTS

| | | | | |
|---|---|---|---|---|
| 8,548,973 B1 * | 10/2013 | Kritt | ................... | G06F 16/9535 707/706 |
| 8,762,184 B2 * | 6/2014 | Rayner | ................ | G06Q 10/025 705/5 |
| 9,785,652 B2 * | 10/2017 | Flynn | ..................... | G06Q 50/12 |
| 10,558,693 B1 * | 2/2020 | Elieson | ............... | G06F 16/3329 |
| 2009/0187551 A1 * | 7/2009 | Lam | ...................... | G06F 16/313 |
| 2014/0351078 A1 * | 11/2014 | Kaplan | ............. | G06Q 30/0631 705/26.7 |
| 2015/0134648 A1 * | 5/2015 | Deshpande | ......... | G06F 21/6209 707/723 |
| 2017/0116341 A1 * | 4/2017 | Wenger | ............... | G06F 16/9535 |

(Continued)

FOREIGN PATENT DOCUMENTS

WO   WO-2016025628 A2 *   2/2016   ......... G06Q 30/0623

OTHER PUBLICATIONS

O'Rielly, "Search, sort and filter, mobile design pattern gallery." Theresa Neil. (Year: 2014).*

(Continued)

*Primary Examiner* — Yogesh C Garg
(74) *Attorney, Agent, or Firm* — Lindauer Law, PLLC

(57) ABSTRACT

A user device such as a tablet may present search results. Filters may be applied to filter the search results. The filtered search results may include indicia that identify that the filtered search results have been filtered and that individual items within the filtered search results correspond to the applied filter. The indicia may fade out over time as the applied filter expires. The filtered search results may also include the individual items that do not correspond to the applied filter. These individual items may have different indicia applied to them, so as to differentiate them from individual items that do correspond to the applied filter. By providing the indicia, a user is provided with a visual confirmation that the search results have been filtered, what filter has been applied, and a differentiation between the individual items that do and do not correspond with the applied filter.

20 Claims, 13 Drawing Sheets

(56) References Cited

U.S. PATENT DOCUMENTS

2017/0193573 A1\* 7/2017 Han .................. G06Q 30/0283
2018/0095966 A1\* 4/2018 Fourney .............. G06F 16/9535
2018/0268455 A1\* 9/2018 Shiely ................ G06Q 30/0603

OTHER PUBLICATIONS

International business machines assigned patent for method and apparatus of temporal filtering for side information interpolation and extrapolation in wyner-ziv video compression systems. (Jul. 26, 2013). Targeted News Service Retrieved from Dialog on Jan. 11, 2022.\*

\* cited by examiner

Continued from FIG. 5
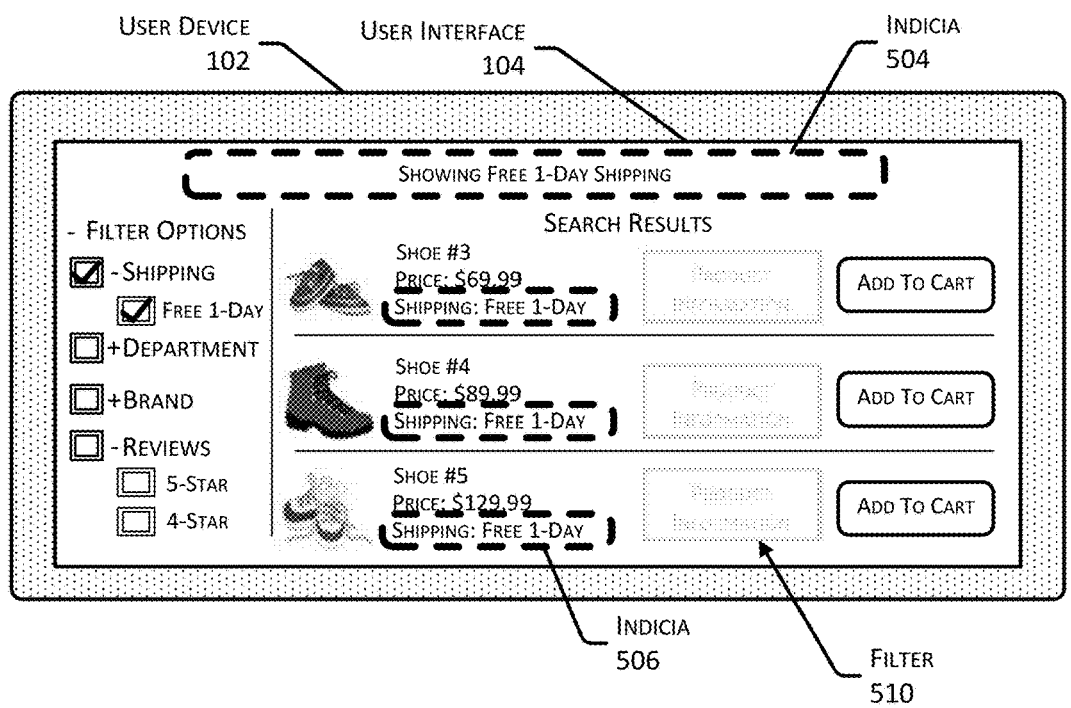
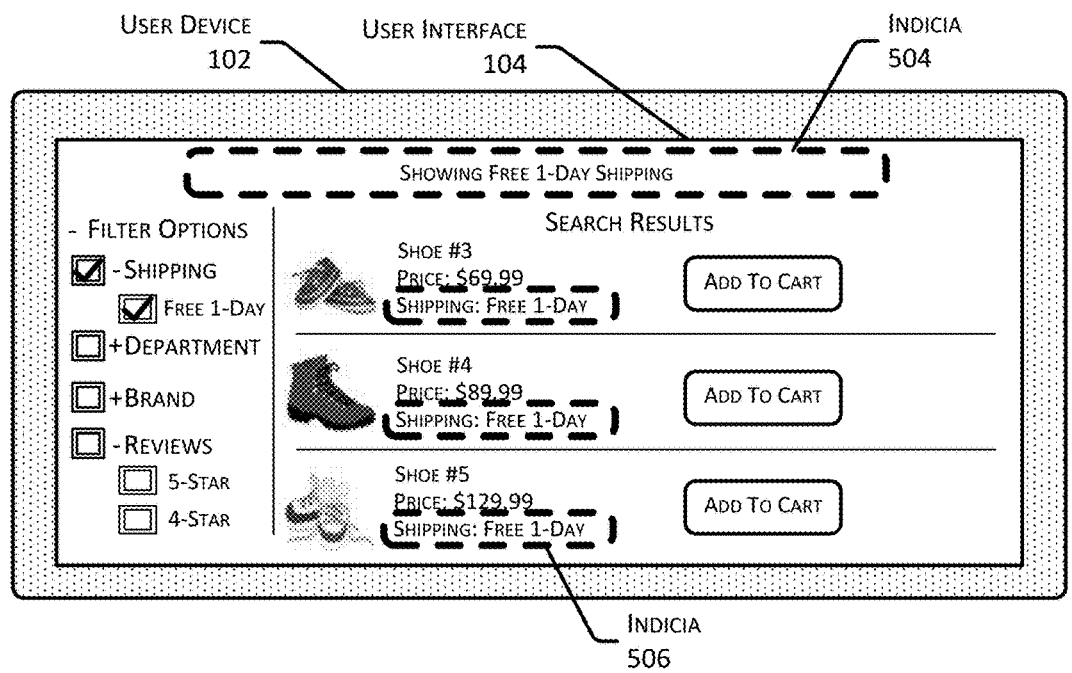
FIG. 6

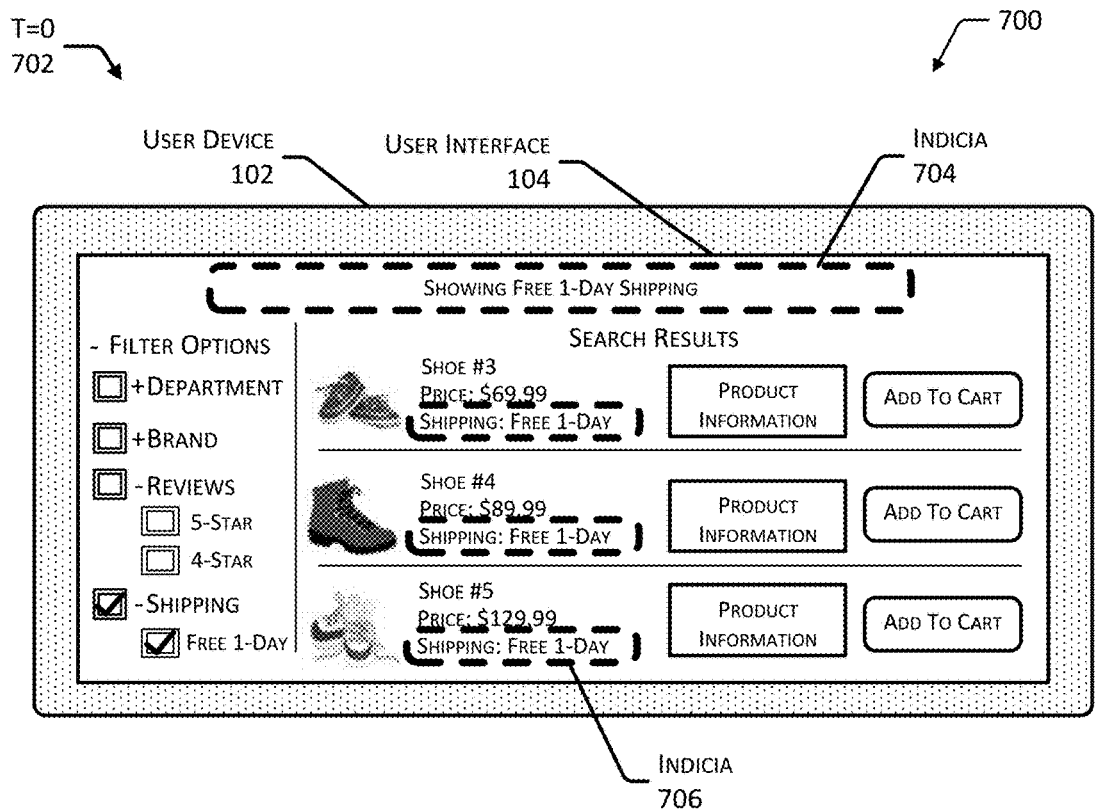
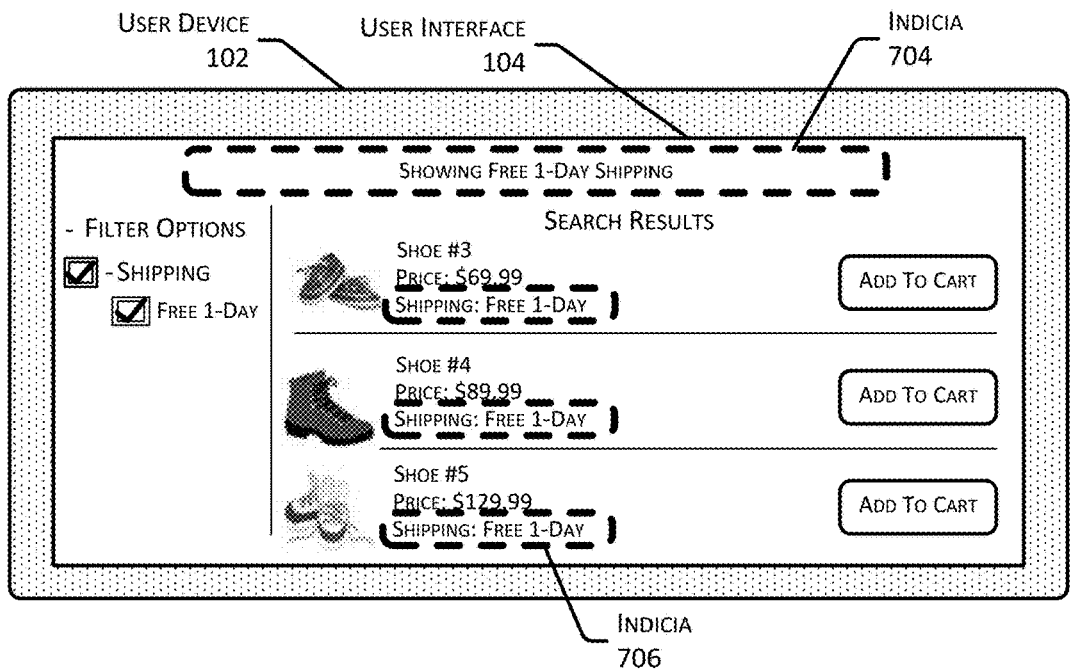
FIG. 7

SYSTEM AND METHOD FOR PROVIDING INDICIA TO FILTERED SEARCH RESULTS TO INDICATE APPLIED FILTERS

BACKGROUND

Datastores may contain information that is of interest to a user. The user may initiate a search or query for particular items or information. Results from the search may be filtered.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 5 and 6 are an example of providing indicia to filtered search results to indicate applied filters and omission of one or more pieces of information over time.

FIG. 7 is an example of providing indicia to filtered search results to indicate applied filters and that omits the presentation of one or more pieces of information.

Figure 1:
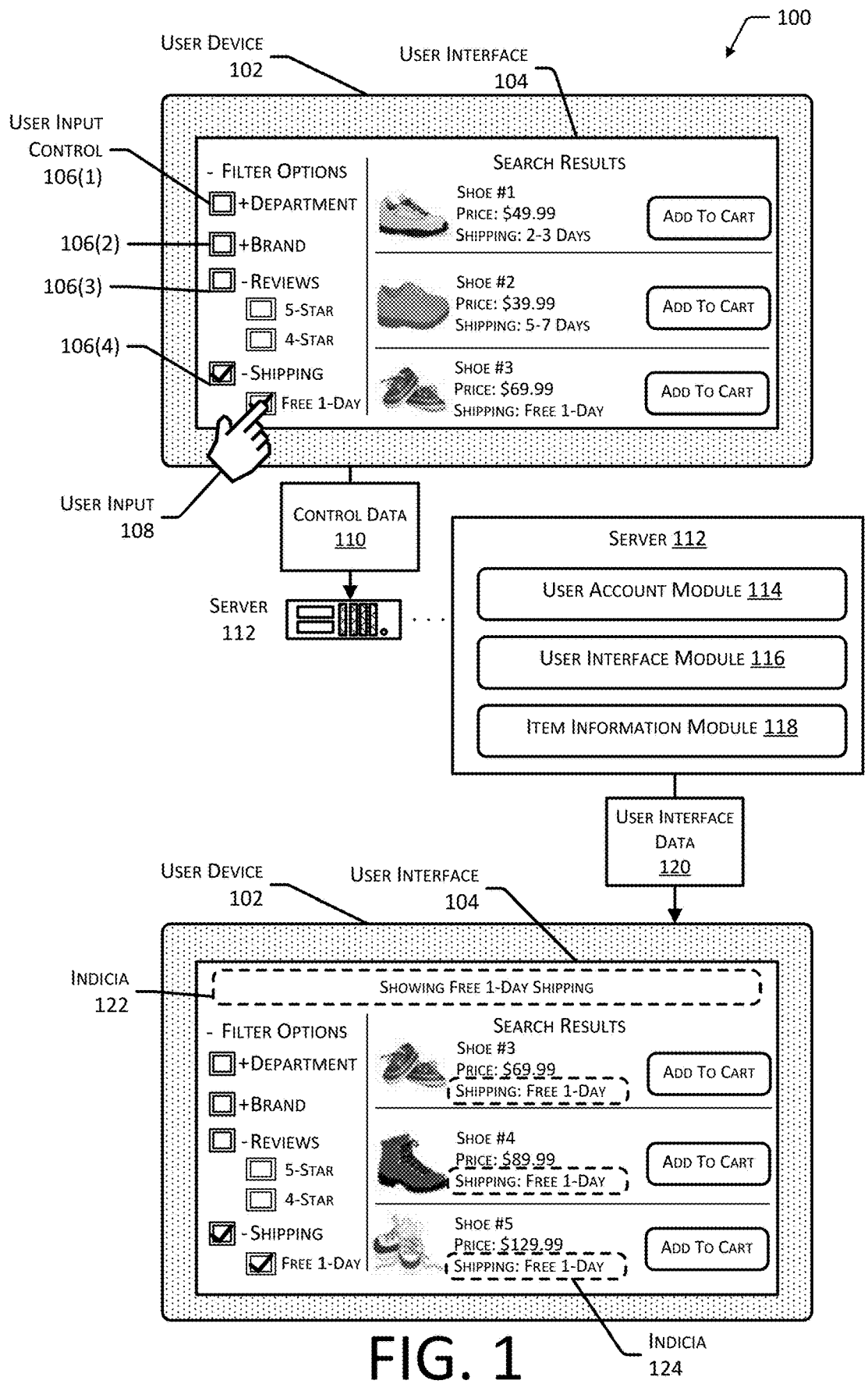
FIG. 1 depicts a schematic of a system for providing indicia to filtered search results to indicate applied filters.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Users are able to access a wide variety of items, content, information, and so forth via networks such as the Internet. A query system connected to a network may receive a user input to search for a particular item. For example, the user input may be a search for bicycles with particular attributes. A server of the query system may execute instructions to search a datastore to identify items that have those particular attributes or have attributes that are similar. The search results containing information about the identified items may be ranked. These ranked search results may then be sent to a user device. For example, the query system may rank the bicycles that are most relevant to the particular attributes indicated in the user input towards the top of the search results and have the bicycles that are less relevant towards the end of the search results. The user device may be a television, tablet computer, personal computer, electronic book reader, gaming console, set-top box, media player, in-vehicle entertainment system, smartphone, server, device control system, a voice activated device, and so forth.

The user device may present the search results. The search results may include a list of numerous items. For example, the list may be five hundred (500) bicycles that have attributes that match or are similar to the user input. A user may prefer to filter the search results by selecting a filter from a plurality of filters. For example, the user may select to filter the results to present only bicycles that are eligible for free shipping. The user device may send data indicative of the selected filter to the query system. The query system may determine the items that correspond to the selected filter and send the filtered results to the user device. For example, the query system may determine that of the five hundred (500) bicycles in the search results, four hundred (400) bicycles are eligible for free shipping. The user device may present the filtered search results. However, it may be difficult for a user to perceive whether the selected filter has been applied. For example, as described above, the original search results had five hundred (500) bicycles and the filtered search results had four hundred (400) bicycles. Based on the list being too long to be presented on the user device, the user may not be able to perceive that the selected filter was applied. This may cause the user to abandon their search or toggle back and forth between the original search results and the filtered search results to determine whether the filter has been applied. The toggling between search results may lead to a larger consumption of computer resources, such as memory and processor allocation as searches are repeated. In addition, increased network bandwidth may be consumed as the user device and those repeated search results are transmitted.

In other implementations, the user device may present a plurality of filters for a user to select. The user device may receive a user input selecting multiple filters. However, the user may be unaware that multiple filters have been selected. For example, the selected filters may be free shipping, items that have a five-star rating, items that are made in a particular country, and so forth. The user device may send data indicative of the selected filters to the query system. The query system may identify the items that correspond to the selected filters and send the filtered search results to the user device. The user device may display the filtered search results and the user may determine that the filtered search results are too narrow or that the filtered search results yield no results. In this example, it may be difficult for the user to determine why the filtered search results are so narrow, as the number of filters available to be selected may be extensive. The extensive list of filters may cause the user to select one or more filters unintentionally. By the user not being able to determine the filters applied, the user experience decreases as the user is frustrated as to receiving search results that are too narrow. In addition, the consumption of user device resources and network bandwidth are increased as the user either toggles between the search results or restarts their search.

This disclosure describes systems and methods for providing indicia to filtered search results to indicate applied filters. As described above, the user device may be configured to present the search results that indicate that five hundred (500) bicycles correspond to the user input. The user device may receive a user input to apply a filter and send data indicative of the selected filter to the query system. The query system may identify the items that correspond to the selected filters and send the filtered search results to the user device. For example, the query system may generate filtered search results that includes the four hundred (400) bicycles that correspond to the selected filter.

The user device may present the filtered search results. The presentation of the filtered search results may include indicia with a notification that indicates that the filtered search results have been filtered based on the user selection. For example, the user device may present text that states, "Showing Search Results For Bicycles With Free Two (2) Day Shipping". In addition, the text may include the indicia. The indicia may be highlighting that surrounds an area around the text a particular color, changing the color of the text to be different from the color of other text, surrounding the text with a border, a bullet, and so forth. The presentation of the filtered search results may also include indicia for individual items within the filtered search results. For example, as described above, the filtered search results may include one hundred (100) bicycles. For each of the bicycles a description may be provided. The description may include the price of the bicycle, type of bicycle, average reviews of the bicycle, the shipping method, and so forth. The shipping method description for each of the bicycles may include the indicia. For example, the shipping method indicating that the bicycle has free two (2) shipping may be highlighted indicia. By providing the indicia, a user is provided with a visual confirmation that the search results have been filtered and what filter has been applied.

In other implementations, the presentation of the filtered search results may include omitting the presentation of non-selected filters, omitting the presentation of one or more descriptions, and so forth. For example, the user device may present the filtered search results of the four hundred (400) bicycles and the user selection of the shipping method filter, as described above. In addition, the user device may omit the presentation of the filters not selected. For example, the user device may omit filters that correspond to user ratings, material types, color, item category, and so forth. In addition, the user device may omit the presentation of one or more descriptions associated with individual items. For example, the user device may omit the user rating for the bicycles. By omitting the presentation of non-selected filters or one or more descriptions, the amount of screen space used is minimized.

By using the techniques and systems described above, for example providing the indicia, the user experience is improved as the user is provided a visual confirmation that the search results have been filtered and which items include the attribute associated with the filter. In addition, by providing the visual confirmation, via the indicia, the users are able to navigate the filtered search results faster, which leads to an improved user experience. The experience is improved because faster navigation results in faster decisions to purchase an item. By making faster decisions, the amount of time a user uses the user device is reduced which leads to less battery consumption. Furthermore, the user interface of this application improves the ability of the user device to display information and interact with the user through the use of the indicia. In addition, this application solves problems of prior graphical user interfaces in the context of item purchases relating to speed, accuracy, usability, content suitability (e.g., parental controls), and eliminating any doubts an online customer may have about purchasing a product online, by using the techniques and systems, as described herein.

In addition, other user device resources, such as memory and processor allocation, are reduced as the user device no longer receives user input to go back and forth between the original search results and the filtered search results. Furthermore, overall network bandwidth consumption is reduced as the query system does not need to continuously send the search result data and the filtered search result data to the user device, as the user device is no longer receiving the user inputs to go back and forth between the search results.

Illustrative System

FIG. 1 depicts a schematic of a system 100 for providing indicia to filtered search results to indicate applied filters. The system 100 may include a user device(s) 102 that includes a touchscreen, mouse, or other input device as well as a display device to present a user interface 104. The user device 102 may be a television, tablet computer, personal computer, electronic book reader, gaming console, set-top box, media player, in-vehicle entertainment system, smartphone, server, device control system, a voice activated device, and so forth. The user device 102 may utilize automated speech recognition or other techniques to receive and analyze audible user inputs.

The user device 102 may include a user interface 104. The user interface 104 may be configured to present a plurality of filters, a list of departments, or other categories or groupings for a user to select for filtering search results. While filters are used in the following examples, it is understood that other categories or groupings may be utilized. The filters may correspond to a context-specific attribute. For example, the context-specific attribute may include "department," "brand," "reviews," "shipping method," "material type," "clothing," "toys," "automotive," "Made in America," "organic foods," "non-GMO," and so forth. The user interface 104 may also present sub-filters within a filter for the user to select. For example, the user may select "shipping." The user interface 104 may provide user sub-filters as a drop-down list, such as "free 1-day," "free same day," "2-day," and so forth. Each of the sub-filters may be further subdivided into their own sub-filters that may be selected using the user interface. For example, a sub-filter of "5-7-day shipping" may be further subdivided into sub-filters that include "free 5-7-day shipping," "free additional item with 5-7-day shipping," "cash back with 5-7-day shipping," and so forth.

In some implementations, the user interface 104 may provide user input controls 106(1), 106(2), 106(3), . . . , 106(D). As used in this disclosure, letters in parenthesis such as "(D)" indicate an integer value. The user input controls 106 may be a picker, a switch, and so forth. The picker may include one or more scrollable lists of filters, other categories or groupings, items, attributes, and so forth.

The switch may be a toggle between two mutually exclusive states, such as on and off. For example, the user interface 104 may receive a user input 108 to change the state of the switch from "off" to "on." The "on" state may indicate that the user has selected a filter, such as "free 1-day" shipping.

In other implementations, the user interface 104 may present search results in response to receiving a user input 108 to search for an item with particular attributes. For example, the user device 102 may have received a user input 108 to search for shoes with a particular attribute, such as running shoes. The user interface 104 may present the search results that include a list of numerous items. For example, the list may be five hundred (500) shoes that have attributes that match or are similar to the user input 108. The list may include an image of shoe #1 with a price attribute of $49.99, a shipping attribute of 2-3 days, an image of shoe #2 with a price attribute of $39.99, a shipping attribute of 5-7 days, an image of shoe #3 with a price attribute of $69.99, a shipping attribute of free 1-day, and so forth. In addition, the user interface 104 may present proximate to individual items within the list, an add to cart user input control 106. The add to cart user input control 106 may be configured to enable a user to purchase an item.

A user may prefer to filter the search results. The user device 102 may receive user input 108 selecting one or more of the user input controls 106(1), 106(2), 106(3), . . . , 106(D). Individual user input controls 106(1), 106(2), 106 (3), . . . , 106(D) may correspond to a context-specific attribute to filter the search results, as described above. For example, the user input control 106(1) may correspond to a context-specific attribute to filter the search results by department. In this example, a selection of the user input control 106(1) may filter the search results by such departments as, "Home, Garden & Tools," "Beauty & Health," "Sports & Outdoor," and so forth. The user device 102 may generate control data 110 indicative of the selection of the user input control 106(1) and send the control data 110 to a server 112.

The user input control 106(2) may correspond to a context-specific attribute to filter the search results by a particular brand. For example, a selection of the user input control 106(2) may filter the search results by "Generic Brand A," "Name Brand A," and so forth. The user device 102 may generate the control data 110 indicative of the selection of the user input control 106(2) and send the control data 110 to the server 112.

The user input control 106(3) may correspond to a context-specific attribute to filter the search results by reviews. For example, a selection of the user input control 106(3) may filter the search results by "5-Star Reviews," 4-Star Reviews," and so forth. The user device 102 may generate the control data 110 indicative of the selection of the user input control 106(3) and send the control data 110 to the server 112.

The user input control 106(4) may correspond to a context-specific attribute to filter the search results by shipping method. For example, user input 108 may select the user input control 106(4) to have the search results filtered to present individual items that have a shipping attribute of "free 1-day" shipping. The user device 102 may generate the control data 110. The control data 110 may be indicative of the user input 108 selecting the user input control 106(4). The user device 102 may send the control data 110 to the server 112.

The server 112 may include a user account module 114, user interface module 116, item information module 118, and so forth. The user account module 114 may include information that indicates one or more user attributes. The one or more user attributes may indicate a user's interests, type of vehicle a user drives, types of electronics a user owns, clothing size, shoe size, and so forth. For example, the server 112 may receive a user input 108 searching for running shoes. The user account module 114 may include a user attribute that indicates that the user wears a size 10 running shoe. The server 112 may identify the running shoes within the search results that have a size 10 shoe available. The user interface module 116 may generate user interface data 120 that includes running shoes that have a size 10 available. The server 112 may send the user interface data 120 to the user device 102.

In other implementations, the item information module 118 may include information about items that indicates one or more attributes. The one or more attributes may include the department an item is in, item brand, reviews of the item, shipping method, material type, where the item was manufactured, and so forth. The one or more attributes of an item may correspond to the context-specific attributes of a filter. For example, the server 112 may receive the control data 110 indicating the selection of the user input control 106(4) that corresponds to "free 1-day" shipping. The item information module 118 may identify the items within the search results that have "free 1-day" shipping. The user interface module 116 may generate the user interface data 120 that includes the items that have the shipping method attribute of "free 1-day" shipping. The server 112 may send the user interface data 120 to the user device 102.

In another implementation, the user device 102 upon receipt of the user input 108 may filter the search results and generate the user interface data 120, as described above with respect to the server 112. The user device 102 may include information about the individual items within the search results. The information may indicate one or more attributes, as described above. The user device 102 may identify the individual items that have an attribute that corresponds to the context-specific attribute of the filter. The user device 102 may filter the search results to include the identified individual items and the indicia 122 and 124, as described above. The user device 102 may also filter the search results based on preferences, as described above.

In other implementations, the filtered search results may also include the individual items that do not include the attribute that corresponds to the context-specific attribute. In this implementation, the user device 102 may filter the search results to have the individual items that do have the attribute listed first and then have the individual items that do not have the attribute listed second.

The user interface 104 may present the user interface data 120 that includes the filtered search results. For example, the user interface 104 may present the user input controls 106(1), 106(2), 106(3), . . . , 106(D), as described above. The user interface 104 may present the filtered search results that include a list of numerous items. For example, the filtered search results may include a list of twenty (20) shoes that have a shipping method attribute of free 1-day shipping. The list may include an image of shoe #3 with a price attribute of $69.99, a shipping attribute of free 1-day shipping, an image of shoe #4 with a price attribute of $89.99, a shipping attribute of free 1-day shipping, an image of shoe #5 with a price attribute of $129.99, a shipping attribute of free 1-day shipping, and so forth. The user interface 104 may present proximate to individual items within the list, an add to cart user input control 106. The add to cart user input control 106 may be configured to enable a user to purchase an item. The user interface may present the indicia 122 and 124. The indicia 122 and 124 may be rendered proximate to the individual items within the filtered search results. The indicia 122 and 124 may indicate that the individual items correspond to the context-specific attribute associated with the filter.

The indicia 122 and 124 may be a border that surrounds text associated with the context-specific attribute associated with the filter. For example, the filtered search results may be based on the user input 108 selecting the user input control 106(4) that corresponds to "free 1-day" shipping. The indicia 122 may include text "Showing Free 1-Day Shipping." The border that surrounds the text may be similar to highlighting the text. The indicia 122 provides a visual confirmation to the user that the filtered search results correspond to items that have the context-specific attribute of free 1-day shipping. Continuing the example, the shipping attribute of free 1-day may be included in the border that surrounds the text, similar to highlighting. The indicia 124 provides a visual confirmation to the user that the individual items presented have the context-specific attribute of free 1-day shipping.

In another implementation, the indicia 122 and 124 may include having the color of the text associated with the context specific attribute changed from a first color to a second color. The second color being different than the first color. For example, the text that corresponds to the context-specific attribute of free 1-day shipping may have a first color of black text. The user interface data 120 may indicate that for the individual items that have the context-specific attribute of free 1-day shipping the color of the font may be changed from black to red. Continuing the above example, the text associated with the shipping attribute of free 1-day shipping for shoes #3, #4, and #5 may change from black to red to provide a visual confirmation to the user that shoes #3, #4, and #5 have the context-specific attribute of free 1-day shipping.

In yet another implementation, the indicia 122 and 124 may include a mark adjacent to the text associated with the context-specific attribute that corresponds to the filter. The mark may be a bullet, number, checkmark, and so forth. For example, the indicia 122 may be a bullet and rendered proximate to the text "Showing Free 1-Day Shipping." Continuing the example, the indicia 124 may be a bullet and rendered proximate to the shipping attribute of free 1-day shipping for shoes #3, #4, and #5.

In other implementations, the indicia 122 and 124 may include a border to surround the text associated with the context-specific attribute and changing the color of the text from the first color to the second color. For example, the indicia 122 may include text "Showing Free 1-Day Shipping." The border that surrounds the text may be similar to highlighting the text. The shipping attribute of free 1-day shipping for shoes #3, #4, and #5 may include the indicia 124 that includes the border that surrounds the text, similar to highlighting. Continuing the example, the color of the text associated with the shipping attribute of free 1-day shipping for shoes #3, #4, and #5 may change from black to red.

In some implementations, the user interface data 120 may be or include audible data. The audible data may provide an audible output listing the individual items within the filtered search results. For example, the user device 102 may provide the audible output of listing the individual shoes, such as an audible output indicating shoe #3 is included in the list, that it has a price attribute of $69.99, and a shipping attribute of free 1-day. The user device 102 may continue to provide the above audible output for the remaining items in the list. The user device 102 may also provide an audible output for the indicia 122 and 124. For example, the user device 102 may provide an audible output indicating that the following items in the list have the shipping attribute of free 1-day which corresponds to the context-specific attribute of the selected filter. In addition, the user device 102 may provide an audible output for the individual items that have the indicia 124. The audible output for the indicia 124 may be an earcon. The earcon may be a distinct sound to indicate that the individual items correspond to the context-specific attribute. In other implementations, the audible output for the indicia 124 may include a change in pitch in the audible output from a first pitch to a second pitch to indicate that the individual items correspond to the context-specific attribute of the selected filter(s). In yet another implementation, the audible output for the indicia 124 may be a change in voice of the audible output from a first voice to a second voice to indicate that the individual items correspond to the context-specific attribute of the selected filter(s).

In other implementations, the user interface 104 may present advertisements adjacent to the filtered search results. The advertisements may correspond to the user input 108 to search for an item with particular attributes. For example, the user input 108 may be to search for running shoes. The advertisements may include running shoes from a particular retailer or brand, other types of shoes, running shoe accessories, other type of shoe accessories, items related to running, such as running shorts, and so forth. The individual items presented within the advertisements may include the attribute that corresponds to the context-specific attribute of the filter or preference. For example, the individual items within the advertisements may have the shipping attribute of free 1-day shipping.

In another implementation, the user device 102 may receive the user input 108 selecting suitable content or parental controls. For example, the user device 102 may receive the user input 108 selecting parental controls to have only content be displayed that is suitable for all children. The user interface 104 may present the indicia 122 and 124 as described above. The indicia 122 and 124 may indicate that the available content corresponds to the selected parental controls. For example, the user interface 104 may present a list of content that a user may select to view. The list of content being presented may include the indicia 122 and 124 that indicates that the list of content includes only content that is suitable for all children. In addition, the indicia 124 may be rendered proximate to individual ones of content indicating that the individual content is suitable for all children. In subsequent searches for content, the server 112 may access the user account module 114 to determine whether a parental control should be applied or the server 112 and may maintain the previously selected parental controls. For example, the server 112 may receive a user input searching for content. The server 112 may determine, via the user account module 114 or a previously selected parental control, that content only suitable for all children should be presented. The server 112 may filter the list of content based on the determination and send the filtered list of content to the user device 102. The filtered list of content may include the indicia 122 and 124, as described above.

Figure 2:
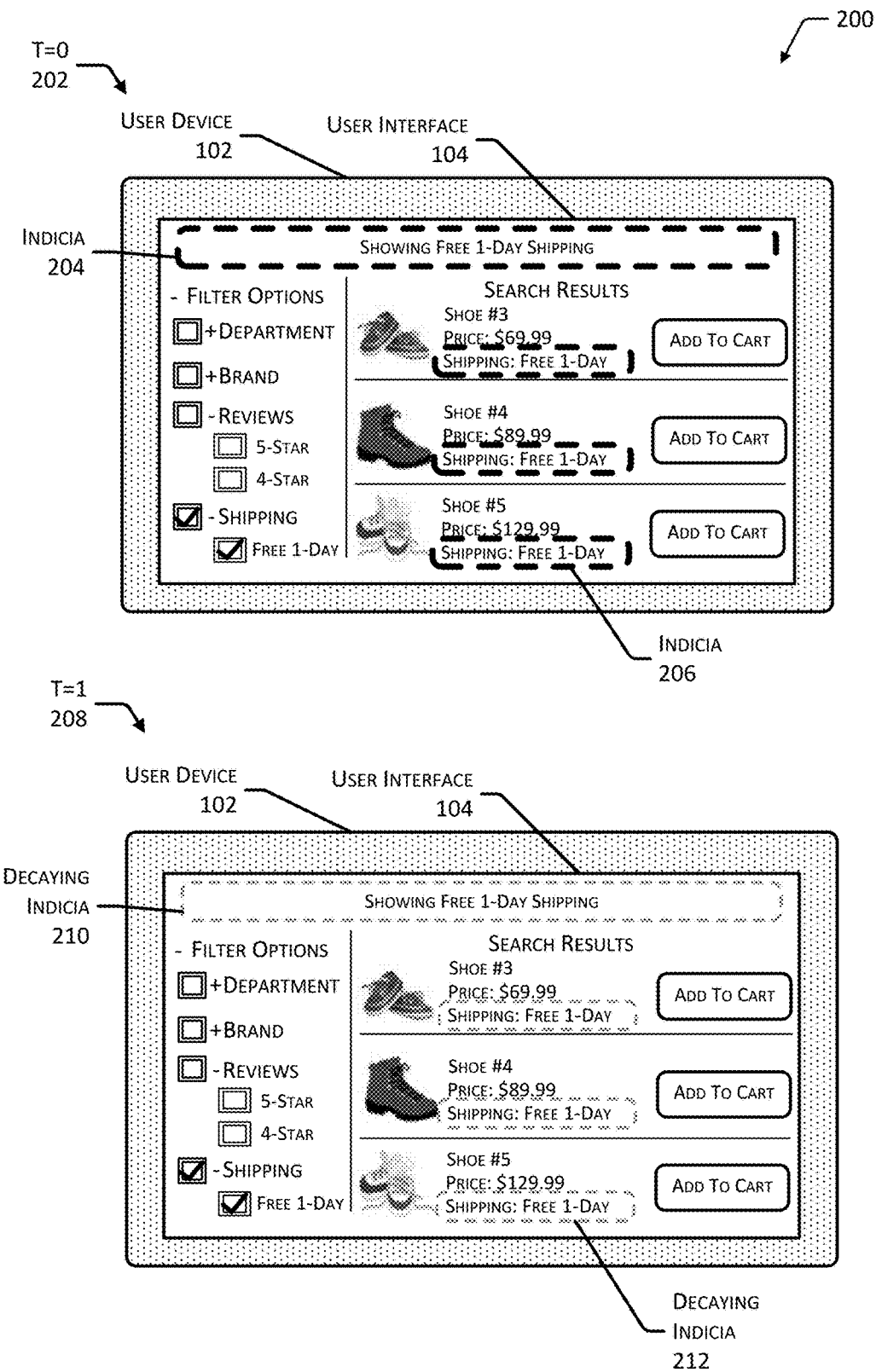
FIGS. 2 and 3 are an example of providing indicia to filtered search results to indicate applied filters that decay over time.

FIG. 2 is an example 200 of providing indicia to filtered search results to indicate applied filters that decay over time. The example 200, at 202 (T=0), includes the user device 102, as described above. The user interface 104 may present the filtered search results showing the items that correspond to the context-specific attribute of the filter that the user selected. For example, the user may have selected the "free 1-day" shipping filter. The presented filtered search results may be a list that includes an image of shoe #3 with a price attribute of $69.99, a shipping attribute of free 1-day shipping, an image of shoe #4 with a price attribute of $89.99, a shipping attribute of free 1-day shipping, an image of shoe #5 with a price attribute of $129.99, a shipping attribute of free 1-day shipping, and so forth. In one implementation, the selection of the user input control 106(4) to have the search results filtered may have been from a previous selection. For example, the user may have previously selected the user input control 106(4). The previous selection may have occurred minutes ago, hours, days, weeks, and so forth. The user device 102 or the server 112 may store that selection for future searches. For example, as illustrated, the user may have searched for running shoes. The server 112 may send the user interface data 120. The user interface data 120 may include filtered search results based on the previous selection, as described above. The user interface data 120 may also include instructions to cause the user interface 104 to present indicia 204 and 206. The indicia 204 or 206 may indicate that the presented search results are based on a previous selection of the user input control 106(4) to present search results that include individual items that have an attribute that corresponds to the context-specific attribute of the filter.

In other implementations, the presented filtered search results may be based on information associated with the user, a device, a location, and so forth. The user may indicate during registration with the user account module 114 that for searches a particular preference or filter may be applied. For example, the user may indicate that a shipping filter of free 1-day shipping may be applied. As illustrated, the user may have searched for running shoes. The server 112 may send the user interface data 120. The user interface data 120 may include filtered search results based on user information indicating a particular preference or filter to be applied, as described above. For example, the search results may include running shoes that have a shipping attribute of "free 1-day" shipping. The user interface data 120 may also include instructions to cause the user interface 104 to present indicia 204 and 206. The indicia 204 or 206 may indicate that the presented search results are based on a particular preference of the filter. In another example, the server 112 may receive a user input 108 to search for a particular item, such as running shoes. The server 112 may access the user account module 114 to determine that based on past purchases or a preference the user wears size 10 shoes. As described above, the server 112 may generate the user interface data 120 to include running shoes that are available in a size 10 and include the indicia 204 and 206 to indicate that the search results are based on a preference to present shoes available in a size 10.

The indicia 204 may be similar to the indicia 122 and the indicia 206 may be similar to the indicia 124, as described above. The indicia 204 may include text "Showing Free 1-Day Shipping." In one implementation, the indicia 204 may include a border that surrounds the text. The border may be similar to highlighting the text. The indicia 204 provides a visual confirmation to the user that the filtered search results correspond to items that have the context-specific attribute of free 1-day shipping. Continuing the example, the indicia 206 may be a border that surrounds the text of the shipping attribute free 1-day for each of the individual items within the filtered search results. The border that surrounds the text may be similar to highlighting. The indicia 206 provides a visual confirmation to the user that the individual items presented have free 1-day shipping. In other implementations, the indicia 204 and 206 may include changing the color of the text from a first color to a second color, include a mark rendered proximate to the attribute that corresponds to the filter context-specific attribute, a border that surrounds the text and changing the color of the text, and so forth, as described above.

At 208 (T=1), the user interface 104 may present the filtered search results, the filter options, decaying indicia 210 and 212, and so forth. The user device 102 may cause the user interface 104 to adjust the indicia 204 to the decaying indicia 210 based on the user interface data 120. The user device 102 may cause the user interface 104 to adjust the indicia 206 to the decaying indicia 212 based on the user interface data 120. The user interface data 120 may include instructions that cause the user device 102 to determine that a first period of time has expired. For example, the user selection of the "free 1-day" shipping filter may be time sensitive. As the amount of time begins to decrease for "free 1-day" shipping to be available for the individual items, the hue or intensity of the decaying indicia 210 and 212 may decrease or begin to fade away. For example, the amount of time available to purchase the shoes #3, #4, #5, and so forth, with "free 1-day" shipping may be 3 hours. The user device 102 may, at 208, determine that 1 hour has elapsed since presenting the filtered search results at 202. The user device 102 may, after determining that 1 hour has elapsed, adjust the indicia 204 to the decaying indicia 210 and the indicia 206 to the decaying indicia 212. The decaying indicia 210 and 212 provide a visual notification to the user that the filtered search results corresponding with the context-specific attribute associated with the selected filter may be expiring or inaccurate.

In other implementations, the user device 102 may cause the user interface 104 to adjust the indicia 204, 206 to the decaying indicia 210, 212 based on the user interface data 120. The user interface data 120 may include instructions that cause the user device 102 to determine that the first period of time has expired. The instructions may also cause the user interface 104 to change the first color of the indicia 204 and 206 to the second color of the decaying indicia 210 and 212. For example, the instructions may indicate that after five (5) minutes have expired that the user interface 104 changes the hue or intensity of the decaying indicia 210 and 212 to produce a fading effect.

Figure 3:
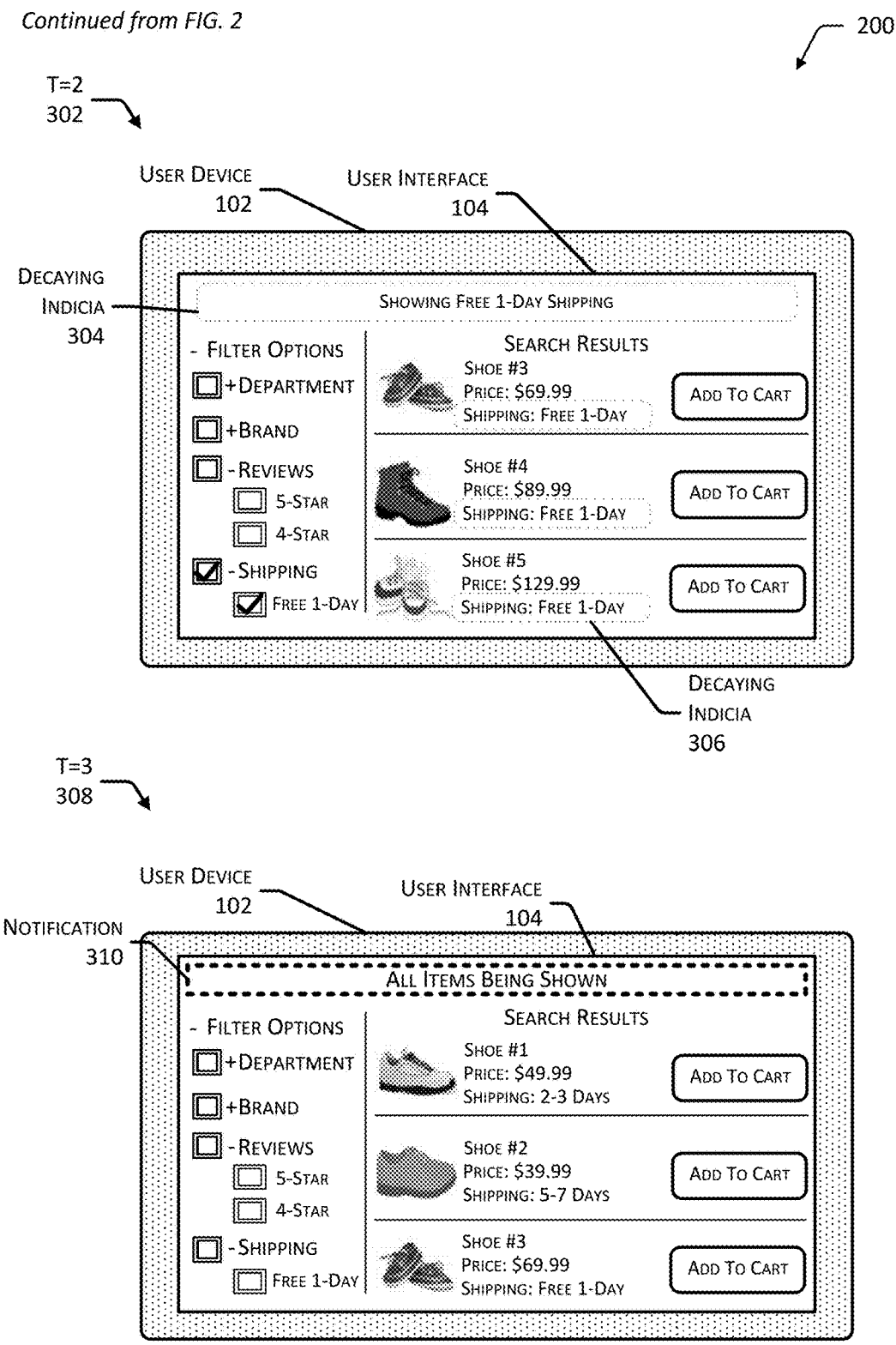

FIG. 3 depicts the continuation of the example 200 from FIG. 2 for providing indicia to filtered search results to indicate applied filters that decay over time. At 302 (T=2), the user device 102 may determine that a second period of time has expired. The user device 102 may cause the user interface 104 to adjust the decaying indicia 210 to decaying indicia 304 and the decaying indicia 212 to decaying indicia 306. The adjusting of the decaying indicia 210, 212 to the decaying indicia 304, 306 may be changing the hue or intensity of the decaying indicia 304, 306 to be less than the hue or intensity of the decaying indicia 210, 212. Continuing the above example, the amount of time available to purchase the shoes #3, #4, #5, and so forth, with "free 1-day" shipping may be 3 hours. The user device 102 may, at 302, determine that 2 hours have elapsed since presenting the filtered search results at 202. The user device 102 may, after determining that 2 hours have elapsed, adjust the hue or intensity of the decaying indicia 210, 212, to the decaying indicia 304, 306 to provide a visual notification to the user that the amount of time is about to expire and that the shoes #3, #4, #5, and so forth, will not be eligible for "free 1-day" shipping shortly.

In other implementations, the user device 102 may cause the user interface 104 to adjust the decaying indicia 210, 212 to the decaying indicia 304, 306 based on the user interface data 120. The user interface data 120 may include instructions that cause the user device 102 to determine that the second period of time has expired. The instructions may also cause the user interface 104 to change the second color of the decaying indicia 210 and 212 to the third color of the decaying indicia 304 and 306. For example, the instructions may indicate that after an additional five (5) minutes have expired that the user interface 104 may continue to produce a fading effect for the decaying indicia 304 and 306.

At 308 (T=3), the user device 102 may determine that a third period of time has expired. The expiration of the third time period may indicate that the context-specific attribute of the filter does not apply anymore. The user interface data 120 may include instructions that when the third time period has expired to present the original search results. The user device 102 upon making this determination, may cause the user interface 104 to present the original search results. The user interface 104 may also omit the presentation of the decaying indicia 304 and 306 and present a notification 310. The notification 310 may include text "All Items Being Shown" to indicate to the user that the context-specific attribute of the filter is no longer being applied and that the original search results are presented. Continuing the above example, the user device 102 may determine that 3 hours have elapsed and that the "free 1-day" shipping filter has expired. The user interface 104 may present the original search results that include shoes #1, #2, #3, #4, #5, and so forth. The user interface 104 may also present the notification 310 that includes the text "All Items Being Shown". The notification 310 may include a border, colored text, mark, and so forth, as described above. The notification 310 provides a visual indication to the user that the "free 1-day" shipping filter has been removed and that the original search results are presented.

In other implementations, after the user device 102 has determined that a period of time has expired, the user device 102 may send data indicative of this determination to the server 112. The server 112 may generate updated user interface data 120 and send the updated user interface data 120 to the user device 102. The server 112 may generate separate updated user interface data 120 each time the user device 102 determines that a period of time has expired. Each of the updated user interface data 120 may include adjusting the indicia 204, 206 to decaying indicia 210, 212, adjusting the decaying indicia 210, 212 to decaying indicia 304, 306, omitting the presentation of the decaying indicia 210, 212, 304 or 306, presenting the original search results with the notification 310, and so forth.

In yet another implementation, the user interface data 120 may include instructions that cause the user device 102 to determine that the third period of time has expired. The instructions may also cause the user interface 104 to omit the presentation of the decaying indicia 304 and 306. For example, the instructions may indicate that after an additional five (5) minutes have expired that the user interface 104 may omit the presentation of the decaying indicia 304 and 306.

Figure 4:
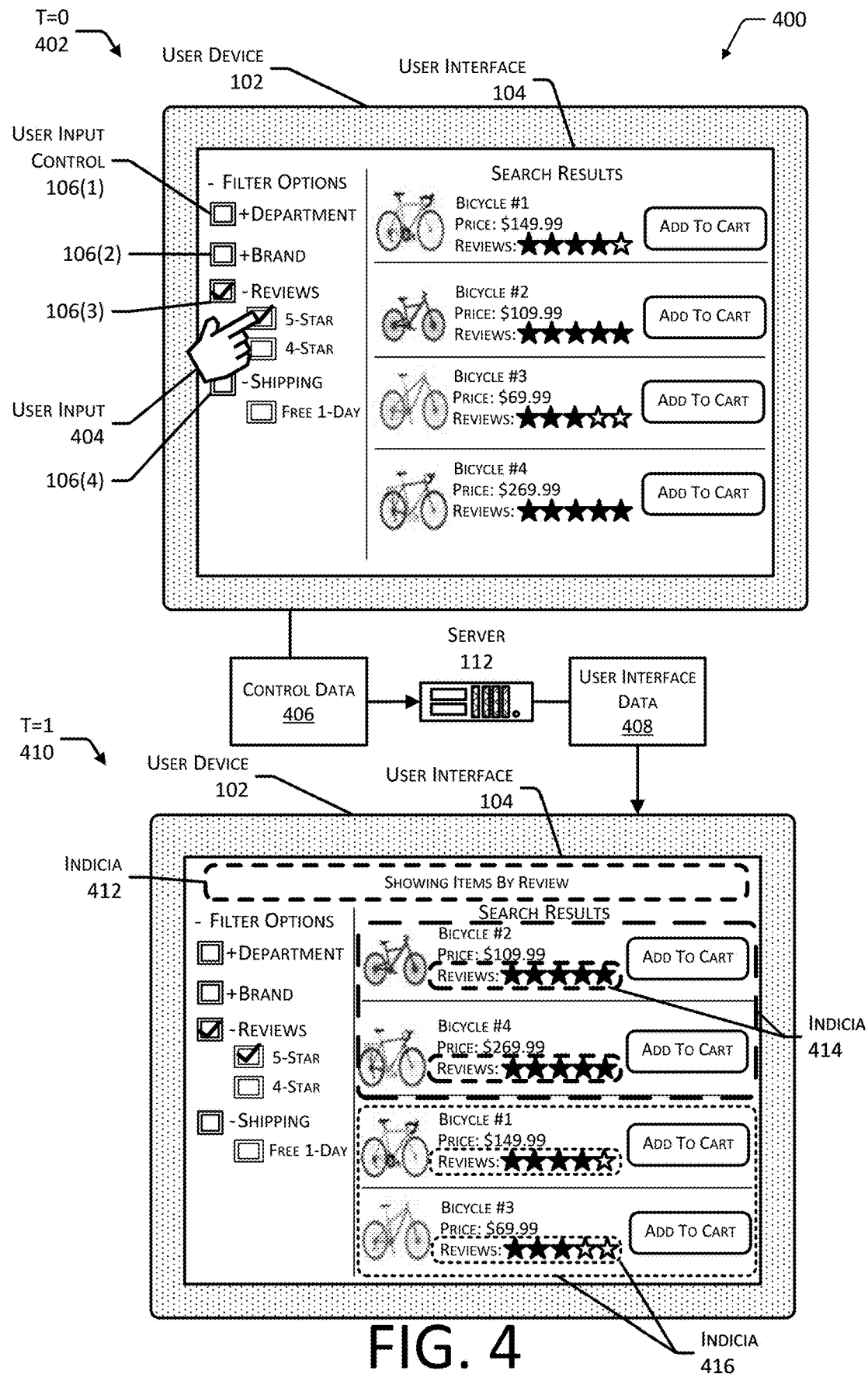
FIG. 4 is an example of providing indicia to filtered search results to indicate applied filters.

FIG. 4 is an example 400 of providing indicia to filtered search results to indicate applied filters. The example 400, at 402 (T=0), includes the user device 102, as described above. The user interface 104 may provide the user input controls 106(1), 106(2), 106(3), . . . , 106(D), as described above. Individual user input controls 106(1), 106(2), 106(3), . . . , 106(D) may correspond to a context-specific attribute to filter the search results, as described above. The selected context-specific attribute may have been a user preference, a current user selection, or a previous user selection, as described above. The user interface 104 may present the search results that include a list of numerous items. For example, the list may be three hundred (300) bicycles that have attributes that match or are similar to a user input to search for bicycles. The list may include an image of bicycle #1 with a price attribute of $149.99, and a reviews attribute of 4-stars, an image of bicycle #2 with a price attribute of $109.99, and a reviews attribute of 5-stars, an image of bicycle #3 with a price attribute of $69.99, and a reviews attribute of 3-stars, an image of bicycle #4 with a price attribute of $269.99, and reviews attribute of 5-stars, and so forth. In addition, the user interface 104 may present proximate to the individual items within the list, an add to cart user input control 106, as described above.

A user may prefer to filter the search results. The user device may receive user input 404 selecting the user input control 106(3). The user input control 106(3) may correspond to the context-specific attribute to filter the search results by "5-Star Reviews." The user device 102 may generate control data 406. The control data 406 may be indicative of the user input 404 selecting the user input control 106(3). The user device 102 may send the control data 406 to the server 112.

The server 112 may include the user account module 114, the user interface module 116, the item information module 118, and so forth, as described above. The server 112 may access the item information module 118 to determine the individual items within the search results that have an attribute that corresponds to the context-specific attribute of the filter. For example, the server 112 may access the item information module 118 to determine the individual bicycles within the search results that have a review attribute of 5-stars. In this example, the server 112 may identify that bicycles #2, #4, and so forth, have 5-star reviews. In other implementations, the server 112 may also identify the individual items within the search results that do not have the attribute that corresponds to the context-specific attribute of the filter. For example, the server 112 may identify that bicycles #1, #3, and so forth, do not have 5-star reviews. The server 112 may generate user interface data 408 that includes at least the filtered search results and one or more indicia indicating the applied filter and differentiation between individual items within the filtered search results. The server 112 may send the user interface data 408 to the user device 102.

At 410 (T=1), the user interface 104 may present the filtered search results, the filter options, indicia 412, 414, and 416, and so forth. The indicia 412, 414, and 416 may be rendered proximate to the individual items within the filtered search results. The indicia 412, 414, and 416 may indicate that the search results have been filtered and differentiation between individual items. As described above, the indicia 412, 414, and 416 may be a border that surrounds text associated with the context-specific attribute associated with the filter, changing the color of the text from a first color to a second color, including a mark rendered proximate to the attribute that corresponds to the context-specific attribute of the filter, a border that surrounds the text and changing the color of the text, and so forth.

The indicia 412 may include text "Showing Items By Review". The border that surrounds the text may be similar to highlighting the text. The indicia 412 provides a visual confirmation to the user that the individual items within the filtered search results have been filtered to correspond to the context-specific attribute of the filter. For example, the filtered search results for the bicycles have been filtered based on the selection of "5-Star Review". The indicia 414 provides a visual confirmation to the user that the individual items within the filtered search results correspond to the context-specific attribute of the filter. For example, the review attribute of bicycles #2 and #4 includes the indicia 414 to indicate that these bicycles have a review attribute of 5-stars. In another implementation, the indicia 414 may be a border around the individual items that have the attribute that corresponds to the context-specific attribute of the filter. In this implementation, the indicia 414 may provide a visual confirmation of grouping the individual items that match. For example, the user interface 104 may present the indicia 414 to surround or group the bicycles #2 and #4 together indicating they correspond to the "5-Star Review" filter.

The indicia 416 provides a visual confirmation to the user that the individual items within the filtered search results do not correspond to the context-specific attribute of the filter. For example, the review attribute of bicycles #1 and #3 includes the indicia 416 to indicate that these bicycles do not correspond to the user input 404 selecting the context-specific attribute "5-Star Reviews". In another implementation, the indicia 416 may be a border around the individual items that do not correspond to the context-specific attribute of the filter. In this implementation, the indicia 416 may provide a visual confirmation of grouping the individual items that do not match. For example, the user interface 104 may present the indicia 416 to surround or group the bicycles #1 and #3 together indicating they do not correspond to the "5-Star Review" filter.

By including all of the individual items within the filtered search results the user is able to compare the individual items. The contrast between the indicia 414 and 416 provides a visual cue to the user of the difference between the individual items and when the user is viewing an item that does not have an attribute that corresponds to the context-specific attribute of the filter.

Figure 5:
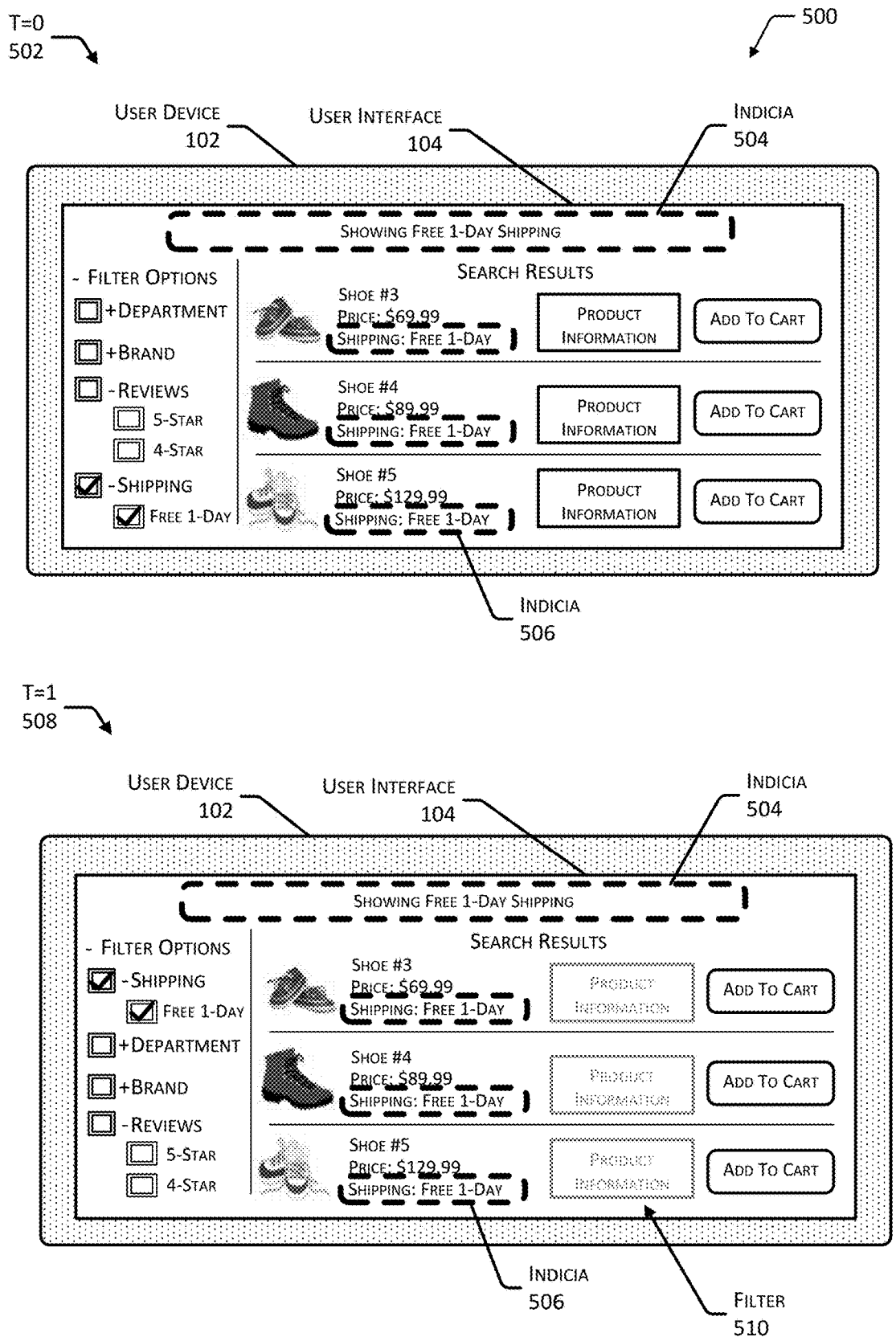

FIG. 5 is an example 500 of providing indicia to filtered search results to indicate applied filters and omission of one or more pieces of information over time. The example 500, at 502 (T=0), includes the user device 102, as described above. The user interface 104 may provide the user input controls 106(1), 106(2), 106(3), . . . , 106(D), as described above. Individual user input controls 106(1), 106(2), 106(3), . . . , 106(D) may correspond to a context-specific attribute to filter the search results, as described above. The user interface 104 may present filtered search results that include a list of items that have been filtered based on a context-specific attribute. For example, the filtered search results may have been filtered based on the context specific attribute of "Free 1-Day" shipping. The selected context-specific attribute may have been a user preference, a current user selection, or a previous user selection, as described above.

The user interface 104 may present the indicia 504 and 506. The indicia 504 may include text "Showing Free 1-Day Shipping", and include a border, as described above. The indicia 504 provides a visual confirmation to the user that the individual items within the filtered search results have been filtered to correspond to the context-specific attribute of the filter. For example, the filtered search results for the shoes have been filtered based on the selection of "Free 1-Day" shipping. The indicia 506 provides a visual confirmation to the user that the individual items within the filtered search results correspond to the context-specific attribute of the filter. For example, the shipping attribute of shoes #3, #4, #5, and so forth, may include the indicia 506 that indicates that the individual pairs of shoes have a shipping attribute of "Free 1-Day". The indicia 504 and 506 may be a border that surrounds text associated with the context-specific attribute associated with the filter, changing the color of the text from a first color to a second color, including a mark rendered proximate to the attribute that corresponds to the context-specific attribute of the filter, a border that surrounds the text and changing the color of the text, and so forth, as described above.

The user interface 104 may present proximate to the individual items within the list, an add to cart user input control 106, as described above. The user interface 104 may also present product information for the individual items within the filtered search results. For example, the user interface 104 may present product information that includes the material of the item, where the item was manufactured, weight of the item, and so forth.

At 508 (T=1), the user interface 104 may present the filtered search results, the filter options, and the indicia 504, and 506, as described above. The indicia 504 and 506 may be similar to the indicia 122 and 124, as described above. The user device 102 may determine that a first period of time has expired. The user device 102 may access the user interface data 120 to determine that a filter 510 may be rendered within the user interface 104. The filter 510 may be a first color that is opaque or non-transparent. The filter 510 may be rendered as an overlay over information that is non-relevant. For example, the product information may be non-relevant. The user interface may render the filter 510 to overlay the product information. By applying the filter 510, the user may be able to more quickly and assuredly select the particular item they wish to purchase. In addition, the user may be able to more quickly and assuredly determine that the filtered search results have been filtered by the user input controls 106(1), 106(2), 106(3), . . . , 106(D) selected. Furthermore, the user may be able to more quickly and assuredly differentiate between the individual items as the indicia 504 and 506 are more prevalent.

The user device 102 may cause the user interface 104 to present a reorder presentation of the user input controls 106(1), 106(2), 106(3), . . . , 106(D), with the selected user input control being presented first. For example, the user interface 104 may present the user input control 106(4) associated with the "Free 1-Day" shipping attribute first and the remaining user input controls 106(1), 106(2), 106(3), . . . , 106(D) to follow. In other implementations, the user device 102 may cause the user interface 104 to render the filter 510 to overlay the non-selected filters, as described above.

In one implementation, the server 112 may determine the non-relevant information and include that determination in the user interface data 120. The server 112 may determine the individual items within the search results that have an attribute that corresponds to the context-specific attribute of the filter, as described above, as being relevant. The server 112 may determine that the user input controls 106(1), 106(2), 106(3), . . . , 106(D) that were not selected as being non-relevant. The server 112 may generate the user interface data 120 to indicate which of the user input controls 106(1), 106(2), 106(3), . . . , 106(D) were not selected and to have the filter 510 rendered over those particular user input controls 106. The server 112 may access the item information module 118 to determine which attributes and product information for the individual items is non-relevant. For example, the server 112 may determine that such product information as where the shoes were manufactured is deemed non-relevant. The server 112 may come to this determination based on the user input 108 selecting the user input control 106(4) corresponding to "Free 1-Day" shipping. The server 112 may determine that based on the user filtering the search results based on the shipping method that a user is more concerned about receiving the item quickly rather than where the item was manufactured. The server 112 may generate the user interface data 120 to indicate that the filter 510 may be rendered over the product information correspond to where the individual item was manufactured. As described above, the server 112 may send the user interface data 120 to the user device 102.

FIG. 6 depicts the continuation of the example 500 from FIG. 5 for providing indicia to filtered search results to indicate applied filters and omission of one or more pieces of information overtime. At 602 (T=2), the user interface 104 may present the filtered search results, the filter options, the indicia 504, and 506, and the filter 510, as described above. The user device 102 may determine that a second period of time has expired. The user interface data 120 may cause the user interface 104 to adjust the color of the filter 510 from a first color to a second color. The second color may be denser or more non-transparent than the first color. By adjusting the filter 510 from the first color to the second color, the user may be able to more quickly and assuredly select the particular item they wish to purchase, as described above.

At 604 (T=3), the user device 102 may determine that a third period of time has expired. The user interface data 120 may cause the user interface 104 to omit the presentation of the non-selected filters and product information that the filter 510 was rendered over. The user interface 104 may move the presentation of the user input control 106(4) that was selected and the add to cart user input control 106 based on the user interface data 120. By omitting the presentation of non-selected filters or product, the amount of screen space used is minimized. By minimizing the amount of screen space used, the user is able to more quickly and assuredly purchase a particular item or more quickly compare and contrast items.

In other implementations, after the user device 102 has determined that a period of time has expired, the user device 102 may send data indicative of this determination to the server 112. The server 112 may generate updated user interface data 120 and send the updated user interface data 120 to the user device 102. The server 112 may generate separate updated user interface data 120 each time the user device 102 determines that a period of time has expired. Each of the updated user interface data 120 may include instructions to apply the filter 510, adjust the color of the filter 510, omit the presentation of the filter 510 and the non-selected filters and product information that the filter 510 was rendered over, and so forth.

FIG. 7 is an example 700 of providing indicia to filtered search results to indicate applied filters and that omits the presentation of one or more pieces of information. The example 700, at 702 (T=0), includes the user device 102, as described above. The user interface 104 may provide the user input controls 106(1), 106(2), 106(3), . . . , 106(D), as described above. Individual user input controls 106(1), 106(2), 106(3), . . . , 106(D) may correspond to a context-specific attribute to filter the search results, as described above. The user interface 104 may present filtered search results that include a list of items that have been filtered based on a context-specific attribute. For example, the filtered search results may have been filtered based on the context specific attribute of "Free 1-Day" shipping. In one implementation, the selection of the user input control 106(4) to have the search results filtered may have been previously selected. For example, the user may have previously selected the user input control 106(4). The selection may have occurred minutes ago, hours ago, days, weeks, and so forth. The user device 102 or the server 112 may store that selection for future searches. For example, as illustrated, the user may have searched for running shoes. The server 112 may send the user interface data 120. The user interface data 120 may include filtered search results based on the previously selected user input control 106(4), as described above. The user interface data 120 may also include instructions to cause the user interface 104 to present indicia 704 and 706. The indicia 704 or 706 may indicate that the presented search results are based on a previous selection of the user input control 106(4) to present search results that include individual items that have an attribute that corresponds to the context-specific attribute of the filter.

In other implementations, the presented filtered search results may be based on user information. The user may indicate during registration with the user account module 114 that for searches a particular preference of the filter be applied. For example, the user may indicate that a shipping filter of free 1-day shipping may be applied. As illustrated, the user may have searched for running shoes. The server 112 may send the user interface data 120. The user interface data 120 may include filtered search results based on user information indicating a particular preference or filter may be applied, as described above. For example, the search results may include running shoes that have a shipping attribute of "Free 1-Day" shipping. The user interface data 120 may also include instructions to cause the user interface 104 to present indicia 704 and 706. The indicia 704 or 706 may indicate that the presented search results are based on a particular preference of the filter. In another example, the server 112 may receive a user input 108 searching for running shoes. The user account module 114 may include a user attribute that indicates that the user wears a size 10 running shoe. The server 112 may identify the running shoes within the search results that have a size 10 shoe available. The server 112 may generate user interface data 120 that includes running shoes that have a size 10 available. The user interface data 120 may also include instructions to cause the user interface 104 to present the indicia 704 and 706 which indicate that the presented search results are for running shoes that have a size 10 available.

The indicia 704 and 706 may correspond to the indicia 122 and 124 as described above. The indicia 704 may include text "Showing Free 1-Day Shipping" and include a border around the text as described above. Individual items within the filtered search result may include the indicia 706. The indicia 706 may include a border around the attribute that corresponds to the context-specific attribute of the filter, as described above. For example, the indicia 706 may be a border around the shipping attribute for each of the shoes listed in the filtered search results.

At 708 (T=1), the user device 102 may determine that a time period has expired. The user device 102 may access the user interface data 120 to determine that the information that includes the attribute that corresponds to the context-specific attribute to be relevant. For example, the user device 102 may determine that the image of the shoes, the price attribute and the shipping attribute are relevant. The user device 102 may also determine at least a portion of the information that does not include the attribute as being non-relevant. For example, the user device 102 may determine that the non-selected user input controls 106(1), 106(2), 106(3), . . . , 106(D) are non-relevant. The user device may also determine one or more pieces of product information may be non-relevant, as described above. The user interface data 120 may indicate that non-relevant information may be omitted from being presented. For example, the user interface 104 may omit the presentation of the non-selected user input controls 106(1), 106(2), 106(3), . . . , 106(D). The user interface 104 may also omit presentation of the product information. The user interface 104 may move the presentation of the user input control 106(4) that was selected and the add to cart user input control 106 based on the user interface data 120. By omitting the presentation of non-selected filters or product information, the amount of screen space used is minimized. By minimizing the amount of screen space used, the user is able to more quickly and assuredly purchase a particular item or more quickly compare and contrast items.

In another implementation, the user interface data 120 may indicate to present only the information that is determined to be relevant, rather than first determining that a period of time has expired. For example, when the user device 102 receives the user interface data 120, rather than presenting the user interface 104 as at 702 (T=0), the user interface data 120 may indicate to initially present the user interface 104 as at 708 (T=1).

In other implementations, after the user device 102 has determined that a period of time has expired, the user device 102 may send data indicative of this determination to the server 112. The server 112 may generate updated user interface data 120 and send the updated user interface data 120 to the user device 102. The updated user interface data 120 may indicate which information is relevant and non-relevant and to present only the information that is deemed relevant.

Figure 8:
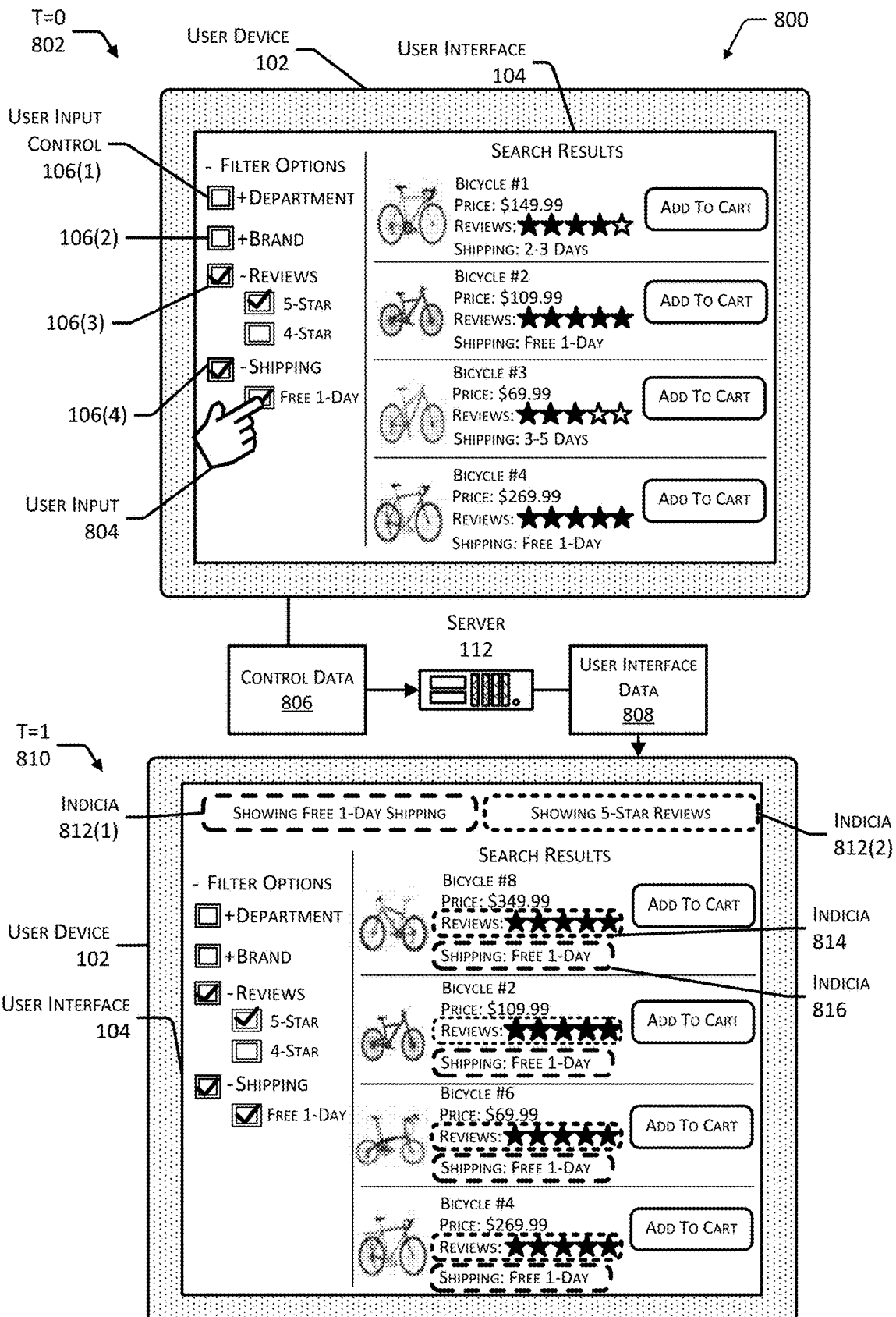
FIG. 8 is an example of providing indicia to filtered search results to indicate applied filters.

FIG. 8 is an example 800 of providing indicia to filtered search results to indicate applied filters. The example 800, at 802 (T=0) may include the user device 102. The user interface 104 may provide the user input controls 106(1), 106(2), 106(3), . . . , 106(D), as described above. Individual user input controls 106(1), 106(2), 106(3), . . . , 106(D) may correspond to a context-specific attribute to filter the search results, as described above. The user interface 104 may present the search results that include a list of numerous items. For example, the list may be three hundred (300) bicycles that have attributes that match or are similar to a user input to search for bicycles. The list may include an image of bicycle #1 with a price attribute of $149.99, a review attribute of 4-stars, and a shipping attribute of 2-3 days shipping; an image of bicycle #2 with a price attribute of $109.99, a review attribute of 5-stars, and a shipping attribute of free 1-day shipping; an image of bicycle #3 with a price attribute of $69.99, a review attribute of 3-stars, and a shipping attribute of 3-5 days shipping; an image of bicycle #4 with a price attribute of $269.99, a review attribute of 5-stars, and a shipping attribute of free 1-day shipping; and so forth. In addition, the user interface 104 may present proximate to the individual items within the list, an add to cart user input control 106, as described above.

The user device 102 may receive user input 804. The user input 804 may indicate a selection of user input controls 106(3) and 106(4). For example, the user input 804 may be to have the search results filtered based on bicycles that have a review attribute of 5-Star reviews and have a shipping attribute of free 1-day shipping. The user device 102 may generate control data 806 indicative of the selection. The user device 102 may send the control data 806 to the server 112.

The server 112 may include the user account module 114, the user interface module 116, the item information module 118, and so forth, as described above. The server 112 may access the item information module 118 to determine the individual items within the search results that have an attribute that corresponds to the context-specific attribute of the selected filters. For example, the server 112 may access the item information module 118 to determine the individual bicycles within the search results that have a review attribute of 5-stars and a shipping attribute of free 1-day shipping. In this example, the server 112 may identify that bicycles #2, #4, #6, #8, and so forth, have 5-star reviews and free 1-day shipping. The server 112 may generate user interface data 808 that includes at least the filtered search results and indicia indicating the applied filters and the individual items that correspond to the applied filters. The server 112 may send the user interface data 808 to the user device 102.

At 810 (T=1), the user interface 104 may present the filtered search results, filter options, and indicia 812(1), 812(2), 814, and 816. For example, the user interface 104 may present the user input controls 106(1), 106(2), 106(3), . . . , 106(D) and the filters associated with the individual user input controls 106(1), 106(2), 106(3), . . . , 106(D). The user interface 104 may present a mark indicating the selection of the individual user input controls 106(1), 106(2), 106(3), . . . , 106(D) based on the user input 804. For example, the mark may be a check mark rendered to indicated that user input controls 106(3) and 106(4) were selected. The user interface 104 may also present the filtered search results that include the bicycles that have a review attribute of 5-stars and a shipping method of free 1-day shipping. The user interface 104 may also present images associated with the bicycles and a price attribute as described above.

The indicia 812(1), 812(2), 814, and 816 may be rendered proximate to the individual items within the filtered search results. The indicia 812(1), 812(2), 814, and 816 may indicate that the search results have been filtered and differentiation between individual items. As described above, the indicia 812(1), 812(2), 814, and 816 may be a border that surrounds text associated with the context-specific attribute associated with the filter, changing the color of the text from a first color to a second color, including a mark rendered proximate to the attribute that corresponds to the context-specific attribute of the filter, a border that surrounds the text and changing the color of the text, and so forth.

The indicia 812(1), 812(2), may include text "Showing Free 1-Day Shipping" and "Showing 5-Star Reviews". The border that surrounds the text may be similar to highlighting the text. The indicia 812(1), 812(2), provides a visual confirmation to the user that the individual items within the filtered search results have been filtered to correspond to the context-specific attribute of the filters. For example, the filtered search results for the bicycles have been filtered based on the selection of "5-Star Review" and "Free 1-Day" shipping. The indicia 812(1) and 812(2) may be of different colors. For example, the indicia 812(1) indicates that the search results have been filtered to show "Free 1-Day" shipping. The indicia 812(1) may be a green highlight. The indicia 812(2) indicates that the search results have been filtered to show "5-Star Reviews." The indicia 812(2) may be a yellow highlight. The indicia 812(1), 812(2) provide a visual confirmation to the user that both selected filters have been applied to the search results while the specific colors provide an association between the indicia 812 and the filter that is applied.

The indicia 814 provides a visual confirmation to the user that the individual items within the filtered search results correspond to the context-specific attribute of the filter. For example, the shipping attribute for bicycles #8, #2, #6, #4, and so forth, includes the indicia 814 to indicate that these bicycles have a shipping attribute of free 1-day shipping.

The indicia 814 may include the same color or mark as the indicia 812(1). For example, the indicia 814 may be a green highlight. The indicia 816 provides a visual confirmation to the user that the individual items within the filtered search results correspond to the context-specific attribute of the filter. For example, the review attribute for bicycles #8, #2, #6, #4, and so forth, includes the indicia 816 to indicate that these bicycles have a review attribute of 5-stars. The indicia 816 may include the same color or mark as the indicia 812(2). For example, the indicia 816 may be a yellow highlight. By providing different indicia for the individual indicia the user is able to identify the items that have both of the attributes. The user may also be able to more quickly compare the individual product information of the individual items as the user knows that these items meet the user's criteria of having particular attributes.

Figure 9:
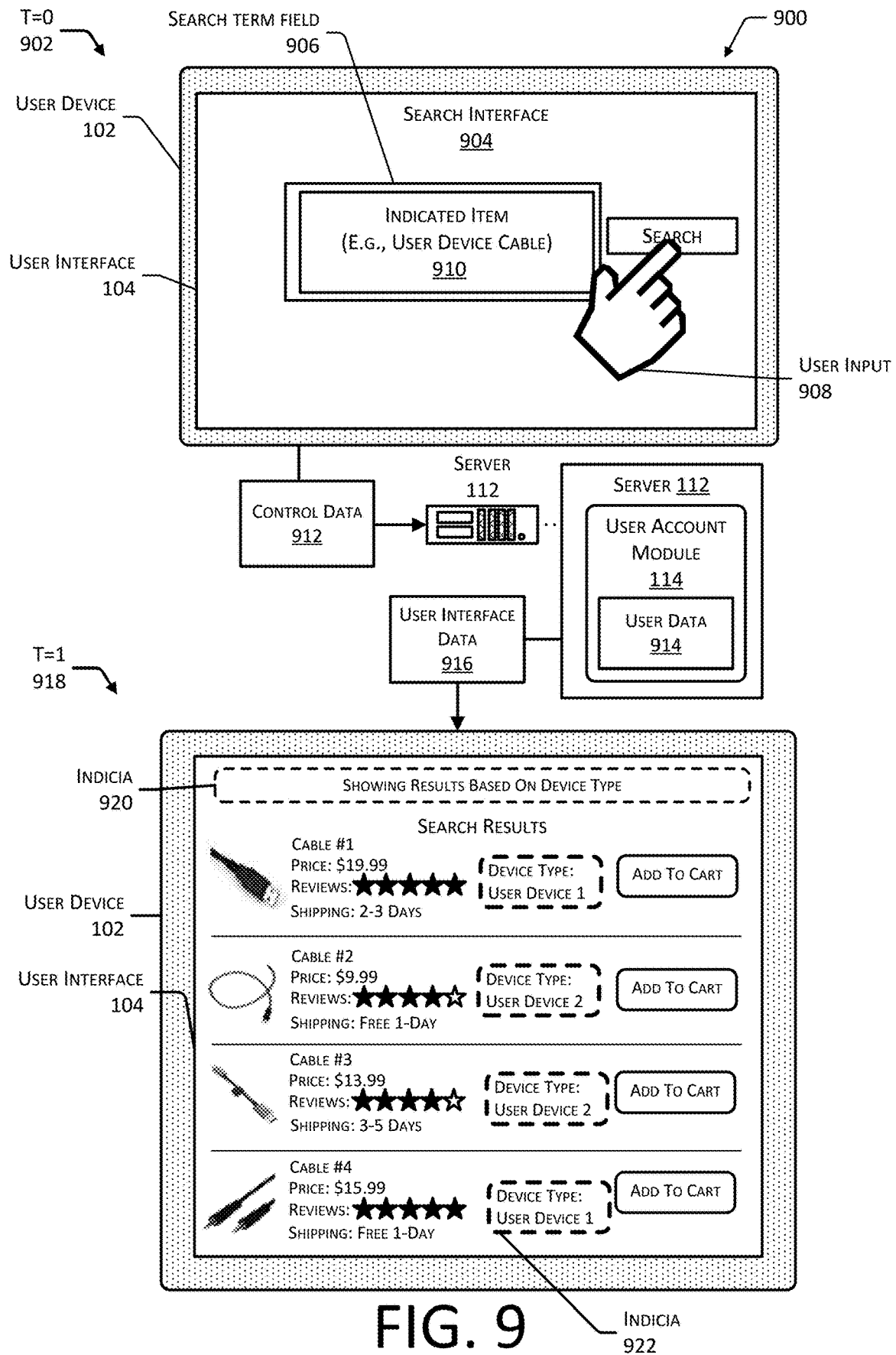
FIG. 9 is an example of providing indicia to filtered search results to indicate applied filters based on user information.

FIG. 9 is an example 900 of providing indicia to filtered search results to indicate applied filters based on user information. The example 900, at 902 (T=0) may include the user device 102. The user interface 104 may be configured to depict a search interface 904 to a user, via a display device. For example, the search interface 904 may implement technology associated with an electronic commerce (eCommerce) website or other online presence. The eCommerce website may include a search engine that indexes information associated with the website. For example, the search engine may index web pages that list items, detail pages, and so forth. The search engine may be a software system that enables users to search and discover items using keyword searches or other types of searches. The search results may be presented in the user interface 104. For example, the search results may comprise a listing of items or links to webpages.

The search interface 904 may include a search term field 906. The search term field 906 may be configured to receive a user input 908. The user input 908 may be indicative of an indicated item 910. The indicated item 910 may be a good, service, food, clothing, electronic content delivered either on physical media or via network transmission, and so forth. For example, the indicated item 910 may for a smartphone cable, such as a universal serial bus (USB) cord to charge the user device 102. The user device 102 may be configured to generate control data 912 indicative of the user input 908. The user device 102 may send the control data 912 to the server 112.

The server 112 may include the user account module 114, the user interface module 116, the item information module 118, and so forth, as described above. The server 112 may access the user account module 114 to determine the individual items within the search results that have an attribute that corresponds to a user attribute. For example, the server 112 may access the user account module 114 to determine the particular brand of the user device 102. The user account module 114 may make this determination based on user data 914. The user data 914 may include a past purchase which indicated the particular brand of the user device 102, user input registering the user device 102, and so forth. The server 112 based on the user data 914 may generate user interface data 916 that includes search results. For example, the server 112 may generate the user interface data 916 to include USB cords and other cords that are compatible with the user device 102. The server 112 may be configured to send the user interface data 916 to the user device 102.

In other implementations, the server 112 may determine the individual items to be included in the search results based on the control data 912. The control data 912 may include information indicating a particular application that the user device 102 is using, information identifying the type of device that the user device 102 is, and so forth. For example, the control data 912 may indicate that the user device 102 is User Device 1. The server 112 may determine the individual items that are compatible with the user device 102. The server 112 may generate the user interface data 916 to include the individual items that are compatible with the user device 102 and send the user interface data 916 to the user device 102.

In another example, the control data 912 may include location information of the user device 102. The location information may describe latitude, longitude, altitude, street address, zip code, state, county, building, floor, and so forth. For example, the location information may indicate that the user device 102 is located in Seattle, Wash. The server 112 may determine the individual items that are located proximate to Seattle, Wash. The server 112 may makes this determination as items that are typically closer to a user's location have a shorter shipping duration than items located further away from a user's location. The server 112 may generate the user interface data 916 to include the individual items that are located proximate to Seattle, Wash. The user interface data 916 may include indicia, such as indicia 922 to indicate that the individual items presented are located proximate to the user device 102. In other implementations, the server 112 may generate the user interface data 916 to include individual items from all locations. In this implementation, the user interface data 916 may include different indicia based on proximity of the individual item to the user device 102. Individual items that are close to the user device 102 may receive one type of indicia, while individual items that are further away may receive a different type of indicia. For example, individual items located in Seattle, Wash. may receive one type of indicia while other individual items located outside of Washington state may receive a different type of indicia.

In other implementations, the user data 914 may include information about multiple users. For example, the indicated item 910 may be for a USB cord. The indicated item 910 may not indicate whether the searched for USB cord is for a particular user device 102. The user account module 114 may access the user data 914 and determine that multiple user devices have been purchased in the past or multiple user devices have been registered. The server 112 may generate the user interface data 916 to have search results that include items that are compatible with the multiple user devices. For example, the user interface data 916 may include USB cords that are compatible with User Device 1 and User Device 2. The server 112 may be configured to send the user interface data 916 to the user device 102.

At 918 (T=1), the user interface 104 may present the search results and indicia 920 and 922. The search results may include of list of items that corresponds to the indicated item 910. For example, the list of items may include USB cables and other cables that are compatible with user device 1 and user device 2. The user interface 104 may also present product information associated with an individual item and attributes associated with the item. For example, the user interface 104 may present an image of cable #1, a price attribute of $19.99, a review attribute of a 5-Star rating, and a shipping attribute of 2-3 day shipping; an image of cable #2, a price attribute of $9.99, a review attribute of a 4-Star rating, and a shipping attribute of free 1-day shipping; an image of cable #3, a price attribute of $13.99, a review attribute of a 4-Star rating, and a shipping attribute of 3-5 day shipping; an image of cable #4, a price attribute of $15.99, a review attribute of a 5-Star rating, and a shipping attribute of free 1-day shipping; and so forth.

The indicia 920 and 922 may be rendered proximate to the individual items within the filtered search results. The indicia 920 and 922 may indicate that the search results have been filtered and differentiation between individual items. As described above, the indicia 920 and 922 may be a border that surrounds text associated with the context-specific attribute associated with the filter, changing the color of the text from a first color to a second color, including a mark rendered proximate to the attribute that corresponds to the context-specific attribute of the filter, a border that surrounds the text and changing the color of the text, and so forth.

The indicia 920 may include text "Showing Results Based On Device Type". The border that surrounds the text may be similar to highlighting the text. The indicia 920 provides a visual confirmation to the user that the individual items within the filtered search results have been filtered to correspond to the user data 914. For example, the filtered search results for the USB cables and other cables may be filtered based on the user data 914 that indicates that the user has multiple devices. The indicia 922 provides a visual confirmation to the user that the individual items within the filtered search results correspond to the user attribute that the user has multiple user devices. For example, the user data 914 may indicate that the user has user device 1, user device 2, and so forth. The indicia 922 may indicate that the cables are compatible with the user device 1, user device 2, or a combination thereof. By providing the indicia 920 and 922 the user is able purchase an individual item more quickly, as the user knows that the individual items within the search results correspond to an item that the user has previously purchased or registered with the user account module 114.

In another implementation, the user device 102 may receive the user input 908 indicative of the indicated item 910. The user device 102 may send the control data 912 to the server 112 and the server 112 may generate the user interface data 916, as described above. The user interface data 916 may include a detailed description page associated with the indicated item 910. For example, the indicated item 910 may be for a particular cord. The user interface data 916 may include the detailed description page that includes information such as the price of the item, shipping attribute, review attribute, product information, and so forth. The detailed description page may be similar to the detailed description illustrated in FIG. 11 at 1114 (T=1). The detailed description page is described in more detail in FIG. 11.

Figure 10:
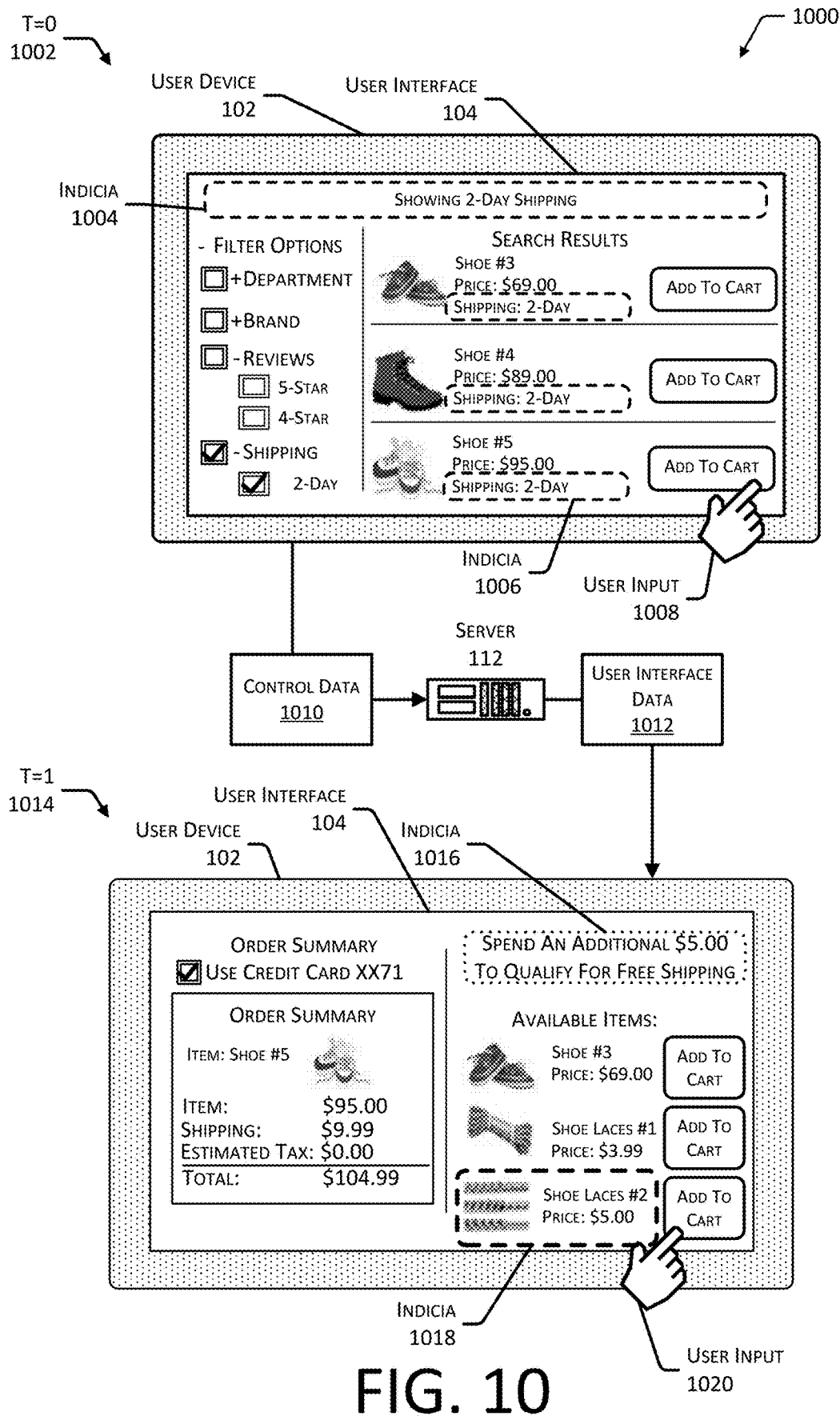
FIG. 10 is an example of providing indicia to filtered search results to indicate one or more additional items for purchasing.

FIG. 10 is an example 1000 of providing indicia to one or more additional items for purchasing. The example 1000, at 1002 (T=0) may include the user device 102. The user interface 104 may provide the filter options associated with the user input controls 106(1), 106(2), 106(3), . . . , 106(D), as described above. The user interface 104 may display the filtered search results and indicia 1004 and 1006. The filtered search results may include a list of items that correspond to a context-specific attribute of a selected filter. For example, the list may be three hundred (300) shoes that have attributes that match the context specific attribute of "2-Day" shipping. The list may include an image of shoe #3 with a price attribute of $69.00, and a shipping attribute of 2-day shipping; an image of shoe #4 with a price attribute of $89.00, and a shipping attribute of 2-day shipping; an image of shoe #5 with a price attribute of $95.00, and a shipping attribute of 2-day shipping; and so forth. In addition, the user interface 104 may present proximate to the individual items within the list, an add to cart user input control 106, as described above.

The indicia 1004 and 1006 may be rendered proximate to the individual items within the filtered search results. The indicia 1004 and 1006 may indicate that the search results have been filtered and differentiation between individual items. As described above, the indicia 1004 and 1006 may be a border that surrounds text associated with the context-specific attribute associated with the filter, changing the color of the text from a first color to a second color, including a mark rendered proximate to the attribute that corresponds to the context-specific attribute of the filter, a border that surrounds the text and changing the color of the text, and so forth.

The indicia 1004 may include text "Showing 2-Day Shipping". The border that surrounds the text may be similar to highlighting the text. The indicia 1004 provides a visual confirmation to the user that the individual items within the filtered search results have been filtered to correspond to the context-specific attribute of the filter. For example, the filtered search results for the shoes have been filtered based on the selection of "2-Day" shipping. The indicia 1006 provides a visual confirmation to the user that the individual items within the filtered search results correspond to the context-specific attribute of the filter. For example, the shipping attribute for shoes #3, #4, #5, and so forth, includes the indicia 1006 to indicate that these shoes have a shipping attribute of 2-day shipping.

The user device 102 may receive user input 1008. The user input 1008 may indicate a selection to purchase one or more items within the filtered search results. For example, the user input 1008 may be to purchase shoe #5. The user device 102 may generate control data 1010 indicative of the user's selection. The user device 102 may be configured to send the control data 1010 to the server 112.

The server 112 may include the user account module 114, the user interface module 116, the item information module 118, and so forth, as described above. The server 112 may determine that a cost for the particular item is less than a total cost threshold. For example, the server 112 may determine that when a user spends over $100.00 that their order qualifies for free shipping. The server 112 may determine costs of additional items that, when combined with the cost of the particular item, meets or exceeds the total cost threshold. For example, the server 112 may determine that when the user spends an additional $5.00 they will receive free shipping. The server 112 may identify one or more items that would exceed the threshold. The server 112 may assign indicia to items that meet or slightly exceed the total cost threshold. For example, the server may determine that shoe laces #2 meets the total cost threshold as the price attribute for the shoe laces #2 is $5.00. The server may assign the indicia 1018 to the shoe laces #2. The server 112 may also determine that items that are within a threshold of the total cost threshold may be assigned the indicia 1018. For example, the server 112 may determine that items that cost greater than $5.00 but less than or equal to $7.00 are to be assigned the indicia 1018, as these items are within the threshold to the total cost threshold. The server 112 may generate user interface data 1012 that includes a list of additional items that the user may wish to purchase, and indicia 1018 associated with the individual items the meet or slightly exceed meeting the total cost threshold. The server 112 may be configured to send the user interface data 1012 to the user device 102.

At 1014 (T=1), the user interface 104 may present an order summary for the purchase of the selected item. For example, the user interface 104 may present an order summary that includes a user input control 106 to select the payment method, such as "use credit card XX71." The order summary may also include an image of the shoe #5, the cost of the item, shipping cost, estimated tax, total cost, and so forth.

The user interface 104 may present a list of available items to purchase and indicia 1016, 1018. The indicia 1016 and 1018 may be rendered proximate to the individual items within the list of available items. The indicia 1016 may indicate that the user almost qualifies for a particular feature or item and differentiation between individual items. As described above, the indicia 1016 and 1018 may be a border that surrounds text associated with the context-specific attribute associated with the filter, changing the color of the text from a first color to a second color, including a mark rendered proximate to the attribute that corresponds to the context-specific attribute of the filter, a border that surrounds the text and changing the color of the text, and so forth.

The indicia 1016 may include text "Spend An Additional $5.00 To Qualify For Free Shipping". The border that surrounds the text may be similar to highlighting the text. The indicia 1016 provides a visual indication that when the user spends a certain additional amount their order qualifies for a feature or item. For example, when the user spends an additional $5.00 their order qualifies for free shipping. The indicia 1018 provides a visual confirmation to the user that a particular item has a cost the meets or slightly exceeds the total cost threshold. For example, the indicia 1018 may indicate that the shoe laces #2 meets or slightly exceeds the total cost threshold of $100.00.

The user device 102 may receive user input 1020. The user input 1020 may be a selection to purchase a particular item. For example, the user device 102 may receive the user input 1020 to purchase the shoe laces #2. By purchasing the shoe laces #2 and the shoes #5 the total cost meets or exceeds the $100 threshold for free shipping.

In other implementations, after receiving the user input 1008 but prior to checkout, the user device 102 may receive a second user input to search for items. The items may correspond to the selected item. For example, the user device 102 may receive a user input to search for shoe laces. The server 112 may generate user interface data 120 that includes individual items that has the attribute that corresponds to the context-specific attribute of the filter or preference. For example, the user interface data 120 may include shoe laces that have 2-day shipping. In addition, the user interface data 120 may include individual items that meet or exceed the threshold, as described above. For example, the user interface data 120 may include shoe laces that meet or slightly exceed the threshold to spend $100.00 and receive free shipping. In another implementation, the server 112 may generate user interface data 1012 that includes individual items that meet or exceed the threshold, as described. In this implementation, the individual items may or may not correspond to the context-specific attribute of the filter or preference. For example, the shoe laces may or may not have 2-day shipping.

Figure 11:
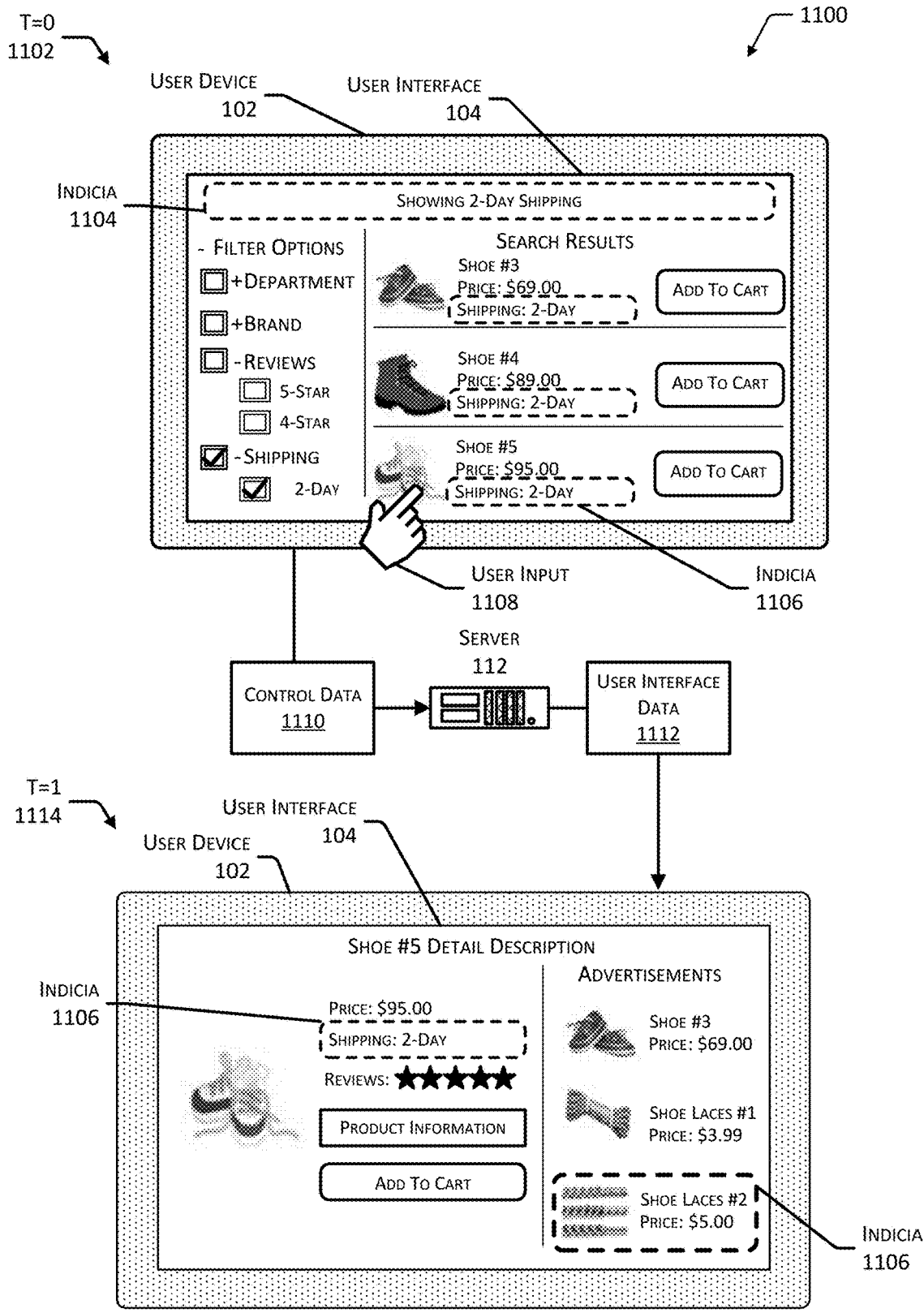
FIG. 11 is an example of providing indicia to filtered search results and item description interfaces to indicate applied filters.

FIG. 11 is an example 1100 of providing indicia to filtered search results and item description interfaces to indicate applied filters. The example 1100, at 1102 (T=0) may include the user device 102. The user interface 104 may provide the filter options associated with the user input controls 106(1), 106(2), 106(3), . . . , 106(D), as described above. The user interface 104 may display the filtered search results and indicia 1104 and 1106. The filtered search results may be based on a current selection of at least one of the user input controls 106(1), 106(2), 106(3), . . . , 106(D), a previous selection from a previous search, a user preference, and so forth, as described above. The filtered search results may include a list of items that correspond to a context-specific attribute of a selected filter. For example, the list may be three hundred (300) shoes that have attributes that match the context specific attribute of "2-Day" shipping. The list may include an image of shoe #3 with a price attribute of $69.00, and a shipping attribute of 2-day shipping; an image of shoe #4 with a price attribute of $89.00, and a shipping attribute of 2-day shipping; an image of shoe #5 with a price attribute of $95.00, and a shipping attribute of 2-day shipping; and so forth. In addition, the user interface 104 may present proximate to the individual items within the list, an add to cart user input control 106, as described above.

The indicia 1104 and 1106 may be rendered proximate to the individual items within the filtered search results. The indicia 1104 and 1106 may indicate that the search results have been filtered and differentiation between individual items. As described above, the indicia 1104 and 1106 may be a border that surrounds text associated with the context-specific attribute associated with the filter, changing the color of the text from a first color to a second color, including a mark rendered proximate to the attribute that corresponds to the context-specific attribute of the filter, a border that surrounds the text and changing the color of the text, and so forth.

The indicia 1104 may include text "Showing 2-Day Shipping". The border that surrounds the text may be similar to highlighting the text. The indicia 1104 provides a visual confirmation to the user that the individual items within the filtered search results have been filtered to correspond to the context-specific attribute of the filter. For example, the filtered search results for the shoes have been filtered based on the selection of "2-Day" shipping. The indicia 1106 provides a visual confirmation to the user that the individual items within the filtered search results correspond to the context-specific attribute of the filter. For example, the shipping attribute for shoes #3, #4, #5, and so forth, includes the indicia 1106 to indicate that these shoes have a shipping attribute of 2-day shipping.

The user device 102 may receive user input 1108. The user input 1108 may indicate a selection to view a particular item. For example, the user input 1108 may be to view shoe #5. The user device 102 may generate control data 1110 indicative of the user's selection. The user device 102 may be configured to send the control data 1110 to the server 112.

The server 112 may include the user account module 114, the user interface module 116, the item information module 118, and so forth, as described above. The server 112 may determine advertisements to be included in user interface data 1112. The determined advertisements may correspond to the user input 1108 to view a particular item. For example, the advertisements may include running shoes from a particular retailer or brand, other types of shoes, running shoe accessories, other type of shoe accessories, items related to running, such as running shorts, and so forth. The individual items presented within the advertisements may include the attribute that corresponds to the context-specific attribute of the filter or preference. For example, the individual items within the advertisements may have the shipping attribute of 2-Day shipping. The server 112 may generate the user interface data 1112 to include the detail description page of the selected item and advertisements that correspond to the selected item and indicia 1106. The server 112 may be configured to send the user interface data 1112 to the user device 102.

At 1114 (T=1), the user interface 104 may present shoe #5 detail description and advertisements that correspond with shoe #5. For example, the user interface 104 may present an image of shoe #5, the price attribute of $95.00, shipping attribute of 2-Day shipping, review attribute of 5-Star review, product information, and an add to cart user control. The product information, as described above, may include material of the shoe, shoe width, offset, where it was made, and so forth. The user interface 104 may present the indicia 1106, as described above. The indicia 1106 provides a visual confirmation to the user that the individual item corresponds to the context-specific attribute of the filter.

The user interface 104 may present advertisements located adjacent to the image of the item, attributes, product information, and so forth. The advertisements, as described above may correspond to the individual item. For example, the user interface 104 may present advertisements that include shoe #3, shoe laces #1, shoe laces #2, and so forth. The user device 104 may present the indicia 1106 around one or more of the advertisements, as described above. For example, the user interface 104 may present the indicia 1106 around shoe laces #2. The indicia 1106 may provide a visual confirmation to the user that shoe laces #2 has a shipping attribute of 2-day shipping. By providing the indicia 1106 around one or more of the advertisements, a visual confirmation is provided indicating that one or more of the advertisements includes the attribute that corresponds to the context-specific attribute of the filter or user preference.

Figure 12:
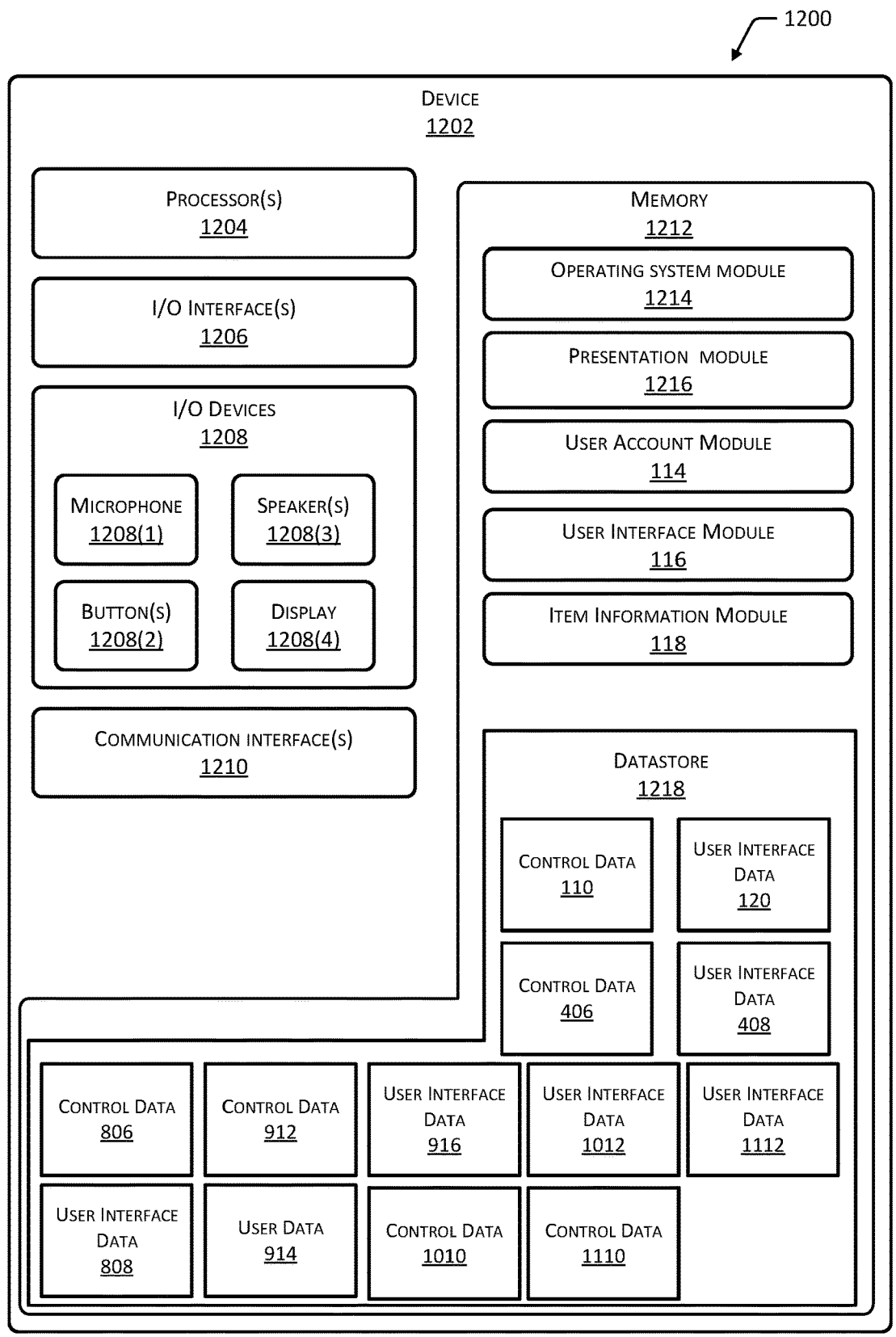
FIG. 12 illustrates a block diagram of a device for providing indicia to filtered search results to indicate applied filters.

FIG. 12 illustrates a block diagram 1200 of a device 1202 for providing indicia to filtered search results to indicate applied filters. The device 1202 may be the user device 102 or the server 112. The device 1202 is illustrative and non-limiting, and may be a desktop computer, a tablet computer, a server, a wearable computer, an e-book reader, a media device, a cellular phone, a laptop computer, or another suitable apparatus. The device 1202 may include one or more processors 1204 configured to execute one or more stored instructions. The processor(s) 1204 may comprise one or more cores, and may also be referred to as hardware processors.

The device 1202 may include one or more input/output (I/O) interface(s) 1206 to allow the processor(s) 1204 or other components of the device 1202 to communicate with various other devices 1202, other computing devices, the server 112, the user device 102, other services, and so on. The I/O interfaces 1206 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 1206 may couple to one or more I/O devices 1208. The I/O devices 1208 may include one or more input devices such as a keyboard, a mouse, a microphone 1208(1), user input buttons 1208(2), and so forth. The I/O devices 1208 may also include output devices such as audio speakers 1208(3), one or more displays 1208(4), and so forth. In some embodiments, the I/O devices 1208 may be physically incorporated within the device 1202, or they may be externally placed. The I/O devices 1208 may include various other devices as well.

The device 1202 may also include one or more communication interfaces 1210. The communication interface(s) 1210 are configured to provide communications with other devices, web-based resources, the server 112, the user device 102, other services, routers, wireless access points, and so forth. The communication interfaces 1210 may include wireless functions, devices configured to couple to one or more networks including local area networks (LANs), wireless LANs, wide area networks (WANs), and so forth. The device 1202 may also include one or more buses or other internal communications hardware or software that allow for the transfer of data between the various modules and components of the device 1202.

The device 1202 includes one or more memories 1212. The memory 1212 comprises one or more computer-readable storage media (CRSM). The memory 1212 provides storage of computer readable instructions, which enables the user device 102, to present the user interface 104, the indicia 122, 124, 204, 206, 412, 414, 416, 504, 506, 704, 706, 812, 814, 816, 920, 922, 1004, 1006, 1016, 1018, decaying indicia 210, 212, 304 306, the notification 310, the user input controls 106(1), 106(2), 106(3), . . . , 106(D), the filter 510, the search results, the filtered search results, the available items, data structures, program modules, and other data used during the operation of the user device 102, or the server 112. The memory 1212 may include at least one operating system (OS) module 1214. Respective OS modules 1214 are configured to manage hardware devices such as the I/O interface(s) 1206, the I/O devices 1208, the communication interface(s) 1210, and provide various services to applications or modules executing on the processors 1204.

Also, stored in the memory 1212 may be one or more of the following modules. These modules may be executed as foreground applications, background tasks, daemons, and so forth. A presentation module 1216 may be configured to present the user interface 104, the indicia 122, 124, 204, 206, 412, 414, 416, 504, 506, 704, 706, 812, 814, 816, 920, 922, 1004, 1006, 1016, 1018, decaying indicia 210, 212, 304 306, the notification 310, the user input controls 106(1), 106(2), 106(3), . . . , 106(D), the filter 510, the search results, the filtered search results, the available items, and so forth. For example, the presentation module 1216 may comprise a web browser.

The memory 1212 may also include the user account module 114. The user account module 114 may include the user data 914, as described above. For example, the user data 914 may indicate previous orders, items registered with a user account, and so forth.

The memory 1212 may also include the user interface module 116. The user interface module 116 may be configured to generate the user interface data 120, 408, 808, 1012, and 1112 as described above. For example, the user interface module 116 may generate the user interface data 120 to include the filtered search results and the indicia 122 and 124.

The memory 1212 may include the item information module 118. The item information module 118, as described above, may include information about items that indicates one or more attributes. The one or more attributes may include the department an item is in, item brand, reviews of the item, shipping method, material type, where the item was manufactured, and so forth. The one or more attributes of an item may correspond to the context-specific attributes of a filter.

The memory 1212 may also include a datastore 1218 to store information. The datastore 1218 may use a flat file, database, linked list, tree, executable code, or other data structure to store the information. In some implementations, the datastore 1218 or a portion of the datastore 1218 may be distributed across one or more user device 102, the server 112, and so forth.

The datastore 1218 may store the control data 110, 406, 806, 912, 1010, the user interface data 120, 408, 808, 916, 1012, 1112, and the user data 914. As described above, the control data 110, 406, 806, 912, 1010, 1110 may indicate a selection of one or more of the user input controls 106(1), 106(2), 106(3), . . . , 106(D). The control data 110 may indicate a user selection to purchase a particular item, as described above. The user interface data 120, 408, 808, 916, 1012, 1112 as described above, may include the filtered search results and the indicia 122, 124, 204, 206, 412, 414, 416, 504, 506, 704, 706, 812, 814, 816, 920, 922, 1004, 1006, 1016, 1018, that indicate the individual items within the filtered search results that have an attribute that corresponds to the context-specific attribute of the selected filter(s). The user data 914, as described above, may include user information. For example, the user information may indicate previous orders.

Figure 13:
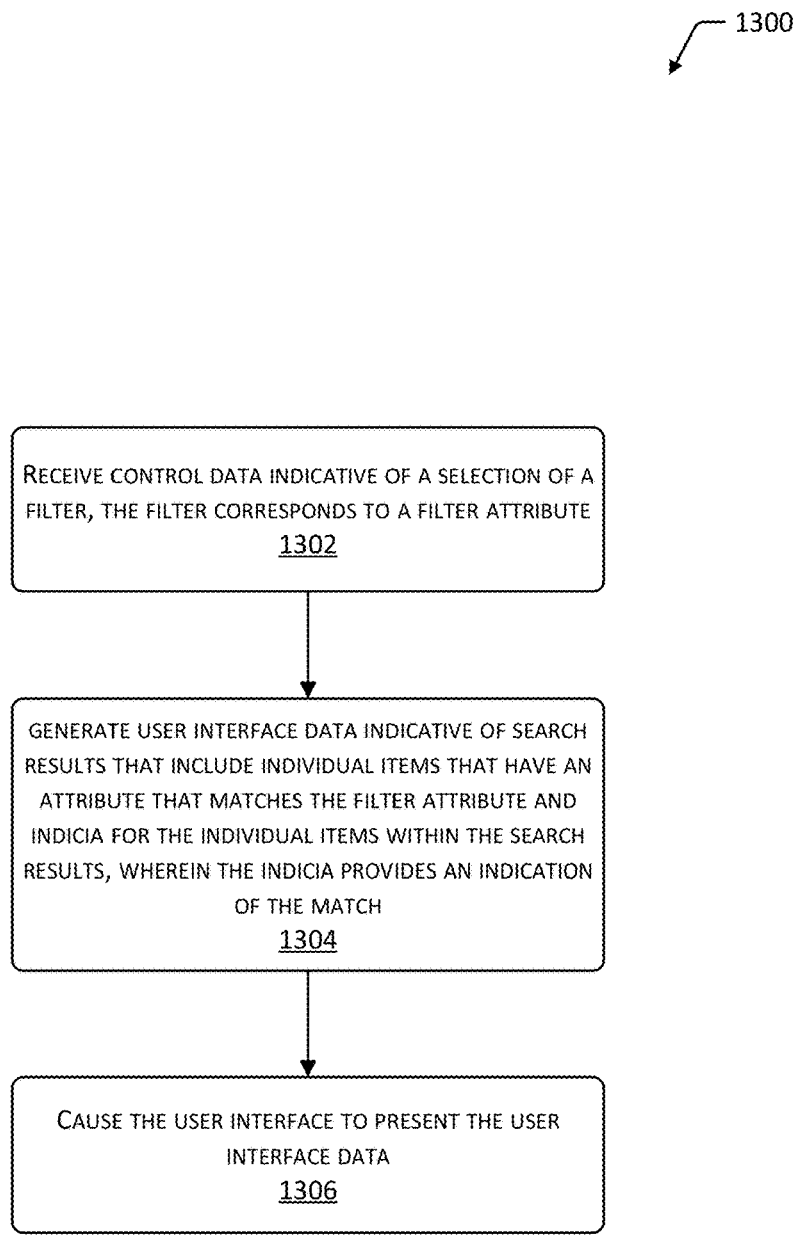
FIG. 13 depicts a flow diagram for providing indicia to filtered search results to indicate applied filters.

FIG. 13 depicts a flow diagram of a process 1300 for providing indicia to filtered search results to indicate applied filters. Although the process 1300 is described with reference to the flowchart illustrated in FIG. 13, many other methods for performing the acts associated with the process 1300 may be used. For example, the order of the steps may be changed, some of the steps described may be optional, and additional steps may be included.

At 1302, the server 112 may receive control data 110. The control data 110 may indicate a selection of a filter. The filter may correspond to a context-specific attribute. For example, the user device 102 may receive the user input 108 selecting the user input control 106(4), as described above. The user input control 106(4) may correspond to a context-specific attribute to filter the search results by shipping method. For example, the context-specific attribute may be "free 1-day" shipping. The user device 102 may generate the control data 110 and send the control data 110 to the server 112, as described above.

At 1304, the server 112 may generate user interface data 120 indicative of search results that include individual items that have an attribute that matches the filter attribute. For example, the server 112 may access the item information module 118. The item information module 118 may include information about items that indicate one or more attributes, as described above. The item information module 118 may identify the items within the search results that have "free 1-day" shipping. The user interface module 116 may generate the user interface data 120 that includes the items that have the shipping method attribute of "free 1-day" shipping. The server 112 may also generate the user interface data 120 to include the indicia 122, 124, for the individual items within the filtered search results, as described above. The indicia 122 and 124 provide an indication that the individual items have an attribute that matches the context-specific attribute of the filter.

At 1306, the server 112 may cause the user interface 104 to present the user interface data 120. For example, the user device 102 may receive the user interface data 120. The user interface 104 may present the user interface data 120 that includes the filtered search results, as described above. For example, the user interface 104 may present the user input controls 106(1), 106(2), 106(3), . . . , 106(D) and the list of shoes that have an attribute that matches the context-specific attribute of the filter, as described above. The user interface 104 may present the indicia 122 and 124, as described above. The indicia 122 and 124 provide a visual confirmation that the filtered search results have been filtered and that the individual items have the attribute that corresponds to the context-specific attribute associated with the filter.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

What is claimed is:

1. A system comprising:
 a user device comprising:
  a display device;
  a memory storing computer-executable instructions; and
  at least one processor in communication with the display device and the memory, the at least one processor executes the computer-executable instructions to:
   receive a first user input indicative of a search for an item;
   send, to a server, first data indicative of the item;
   receive, from the server, user interface data indicative of search results associated with the first user input;
   present, via the display device, the search results and a user control, wherein the user control is associated with a filter that is useable to filter the search results to a context-specific attribute of individual items within the search results;
   receive a second user input indicative of a selection of the user control;
   send, to the server, selected user control data;

receive, from the server, filtered user interface data indicative of the search results filtered based on the selection of the user control; and present, via the display device, at least:

the filtered search results and first indicia rendered proximate to each of the individual items within the filtered search results, wherein the first indicia indicate that the individual items correspond to the context-specific attribute associated with the filter; and second indicia rendered proximate to the filtered search results, wherein the second indicia indicates that the filtered search results correspond to the context-specific attribute associated with the filter, wherein the first indicia and the second indicia comprise one or more of:

changing color of text associated with the context-specific attribute that corresponds to the filter from a first color to a second color, applying a mark adjacent to the text associated with the context-specific attribute that corresponds to the filter, or applying a border to surround the text associated with the context-specific attribute and changing the color of the text from the first color to the second color.

2. The system of claim 1, wherein presenting the first indicia and the second indicia further comprises:

applying the border to surround the text associated with the context-specific attribute associated with the filter.

3. The system of claim 1, wherein the server comprises:

at least one memory storing computer-executable instructions; and at least one processor in communication with the at least one memory, the at least one processor executes the computer-executable instructions to:

receive second data indicative of the selection of the user control;

access a datastore that includes information about the individual items within the search results, the information includes context-specific attributes about the individual items within the search results, wherein the individual context-specific attributes are associated with an individual filter;

identify the context-specific attribute of the individual items within the search results that match the context-specific attribute of the individual filter;

based on the identification, assign the first indicia to the individual items within the search results;

generate the filtered user interface data that includes instructions to cause the user device to present the filtered search results with the first indicia rendered proximate to each of the individual items and the second indicia rendered proximate to the filtered search results; and send the filtered user interface data to the user device.

4. A method comprising:

receiving, from a user device, control data indicative of a selection of a filter, wherein the filter corresponds to a filter attribute;

generating first user interface data indicative of search results that include individual items that have an attribute that matches the filter attribute;

generating second user interface data indicative of indicia for each of the individual items within the search results, wherein the indicia provides an indication of the match; and causing a user interface on the user device to present the first user interface data and the second user interface data.

5. The method of claim 4, wherein the second user interface data further comprises:

adjusting the indicia from a first presentation to a second presentation after a first period of time has expired and omitting presenting the indicia after a second period of time has expired.

6. The method of claim 4, wherein:

the first user interface data further includes the individual items within the search results that do not have the attribute that matches the filter attribute; and the second user interface data further includes second indicia that indicate the individual items that do not correspond to the filter attribute, the second indicia being different than the indicia.

7. The method of claim 4, further comprising:

determining that particular information associated with the individual items are non-relevant; and generating third user interface data indicative of assigning a user interface element to be placed over the determined particular information, wherein the user interface element comprises an opaque color.

8. The method of claim 4, wherein the control data indicative of a selection of the filter comprises one or more of:

a user input indicative of a selection of a user control to filter the search results, or a user preference that includes information about a user, the information includes attributes, wherein an attribute corresponds to the filter attribute and causes the search results to be filtered.

9. The method of claim 4, further comprising:

receiving second control data indicative of a second selection of a second filter, the second filter corresponds to a second filter attribute; and wherein:

generating the first user interface data further includes the individual items that have a second attribute that matches the second filter attribute; and generating the second user interface data further includes second indicia for the individual items within the search results, the second indicia are different than the indicia, and wherein the second indicia provide a second indication that the individual items correspond to the second filter attribute.

10. The method of claim 4, further comprising:

determining a user account associated with the control data, the user account includes information that indicates a user attribute.

11. The method of claim 4, further comprising:

receiving a user selection to purchase a particular item within the search results;

determining that a cost for the particular item is less than a total cost threshold;

determining costs of additional items that combined with the cost of the particular item meets or exceeds the total cost threshold; and generating additional purchase item data that includes second indicia that indicate one or more additional items have a cost that meets or exceeds the total cost threshold.

12. A device comprising:

at least one memory storing computer-executable instructions; and at least one processor in communication with a user device and the at least one memory, the at least one processor executes the computer-executable instructions to:
  receive, from the user device, control data indicative of a selection of a filter, wherein the filter corresponds to a filter attribute;
  generate first user interface data indicative of search results that include at least individual items that have an attribute that match the filter attribute;
  generate second user interface data indicative of indicia that is proximate to each of the individual items and provides an indication of the match; and
  cause a user interface to present on the user device the first user interface data and the second user interface data.

13. The device of claim 12, wherein the second user interface data further comprises: instructions to adjust the indicia from a first presentation to a second presentation after a first period of time has expired and to adjust the indicia from the second presentation to a third presentation after a second period of time has expired.

14. The device of claim 12, wherein the first user interface data and the second user interface data are audible data that provides an audible output listing the individual items within the search results and the indicia indicate that the individual items match the filter attribute.

15. The device of claim 14, wherein the audible output for the indicia comprises one or more of:
  an earcon indicative of a distinct sound to indicate that the individual items correspond to the filter attribute;
  a change in pitch in the audible output from a first pitch to a second pitch to indicate that the individual items correspond to the filter attribute; or
  a change in voice of the audible output from a first voice to a second voice to indicate that the individual items correspond to the filter attribute.

16. The device of claim 12, wherein the second user interface data further comprises instructions to adjust the indicia from a first presentation to a second presentation after a first period of time has expired and to omit presentation of the indicia after a second period of time has expired.

17. The device of claim 12, wherein the at least one processor of the device further executes computer-executable instructions to:
  determine a user account associated with the control data, the user account includes information that indicates a user attribute; and wherein:
  the first user interface data further comprises instructions to include individual items that have an attribute that matches the user attribute; and
  the second user interface data further comprises indicia that provide an indication that the individual items match the user attribute.

18. The device of claim 12, wherein the at least one processor of the device further executes computer-executable instructions to:
  receive a user selection to purchase a particular item within the search results;
  determine that a cost for the particular item is less than a total cost threshold;
  determine costs of additional items that combined with the cost of the particular item meets or exceeds the total cost threshold; and
  generate additional user interface data that includes second indicia that indicate one or more additional items that have a cost that meets or exceeds the total cost threshold.

19. The device of claim 12, wherein the at least one processor of the device further executes computer-executable instructions to:
  receive second control data indicative of a second selection of a second filter, the second filter corresponds to a second filter attribute; and
  wherein:
    the instructions to generate the first user interface data further include the individual items that have a second attribute that matches the second filter attribute; and
    the instructions to generate the second user interface data further include second indicia for the individual items within the search results, the second indicia are different than the indicia, and wherein the second indicia provide a second indication that the individual items correspond to the second filter attribute.

20. The device of claim 12, wherein the at least one processor of the device further executes computer-executable instructions to:
  determine information that includes the attribute that corresponds to the filter as relevant;
  determine at least a portion of the information that does not include the attribute as being non-relevant; and
  wherein the first user interface data further comprises instructions to only include the information that is determined to be relevant.

* * * * *